(12) United States Patent
Casey et al.

(10) Patent No.: US 10,946,586 B2
(45) Date of Patent: *Mar. 16, 2021

(54) FRAMEWORK FOR ENTERTAINMENT DEVICE COMMUNICATION OF EMBEDDABLE PRINTABLE OBJECTS TO PRINTING DEVICES

(71) Applicant: CenturyLink Intellectual Property LLC, Denver, CO (US)

(72) Inventors: Steven M. Casey, Littleton, CO (US); James M. Feger, Castle Rock, CO (US); Robert J. Morrill, Overland Park, KS (US); Charles I. Cook, Louisville, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 61 days.

This patent is subject to a terminal disclaimer.

(21) Appl. No.: 15/997,590

(22) Filed: Jun. 4, 2018

(65) Prior Publication Data

US 2019/0134910 A1 May 9, 2019

Related U.S. Application Data

(60) Provisional application No. 62/583,987, filed on Nov. 9, 2017.

(51) Int. Cl.
*G05B 19/4099* (2006.01)
*B29C 64/386* (2017.01)
(Continued)

(52) U.S. Cl.
CPC ............ *B29C 64/386* (2017.08); *B33Y 30/00* (2014.12); *G05B 19/4099* (2013.01);
(Continued)

(58) Field of Classification Search
CPC ..... B29C 64/386; G06F 3/128; G06F 3/1292; G06F 3/1287; G06F 17/50; G06F 3/1286; B33Y 30/00; G05B 19/4099
See application file for complete search history.

(56) References Cited

U.S. PATENT DOCUMENTS

2001/0005570 A1  6/2001  Daniel et al.
2014/0058959 A1  2/2014  Isbjornssund et al.
(Continued)

*Primary Examiner* — Darrin D Dunn
*Assistant Examiner* — Marzia T Monty

(57) ABSTRACT

Novel tools and techniques for entertainment device communication to printing devices are provided. A system includes a printing device and media player coupled to the printing device. The media device may include a processor, and a non-transitory computer readable medium comprising instructions executable by the processor to obtain a content stream including at least one of an audio stream or a video stream, the content stream further including a data stream including a trigger associated with a printable model. The instructions may further be executable to obtain a 3-D model file associated with the printable model responsive to an occurrence of the trigger, transmit at least one of the 3-D model file or printing instructions based on the 3-D model file to the printing device, and print, via the printing device, the printable model based on the 3-D model file.

20 Claims, 9 Drawing Sheets

(51) Int. Cl.
 *G06F 3/12* (2006.01)
 *B33Y 30/00* (2015.01)
 *G06F 30/00* (2020.01)

(52) U.S. Cl.
 CPC ............ *G06F 3/128* (2013.01); *G06F 3/1286* (2013.01); *G06F 3/1287* (2013.01); *G06F 3/1292* (2013.01); *G06F 30/00* (2020.01)

(56) References Cited

U.S. PATENT DOCUMENTS

2016/0284122 A1* 9/2016 Tatourian ........... G05B 19/4099
2018/0059631 A1* 3/2018 Newell ................ G05B 19/048
2019/0074574 A1   3/2019 Augustine
2019/0095928 A1   3/2019 Lane

* cited by examiner

FRAMEWORK FOR ENTERTAINMENT DEVICE COMMUNICATION OF EMBEDDABLE PRINTABLE OBJECTS TO PRINTING DEVICES

CROSS REFERENCE TO RELATED APPLICATIONS

This application claims priority to U.S. Provisional Patent Application Ser. No. 62/583,987 filed Nov. 9, 2017 by Steven M. Casey et al., entitled "Entertainment Device Communication to Printing Devices System & Method," the entire disclosure of which is incorporated herein by reference in its entirety for all purposes.

This application may also be related to U.S. patent application Ser. No. 15/997,550, filed Jun. 4, 2018 by Steven M. Casey et al., entitled "System and Method for Entertainment Printables," and U.S. patent application Ser. No. 15/997,583, filed Jun. 4, 2018 by Charles I. Cook et al., entitled "Signature and Entitlement of Three-Dimensional Printable Models." The respective disclosures of these applications are incorporated herein by reference in their entireties for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to three-dimensional (3-D) printing systems and methods, and more particularly to tools for interfacing entertainment systems and devices with a 3-D printer.

BACKGROUND

As 3-D printing technology continues to develop, the availability and accessibility of 3-D printing systems for home and personal use have grown significantly. Moreover, as the capabilities of 3-D printing systems continue to improve, more uses for personal 3-D printing systems will increasingly become commonplace. In conventional usage, a 3-D printer typically requires a user to download, purchase, or otherwise supply a 3-D printable file defining a 3-D printable model for printing by the 3-D printer. 3-D printable models and their associated files are often made available by other users or manufacturers. The 3-D printable files may be manually designed utilizing computer-aided design (CAD) software, or generated using a 3-D scanner, photographs, and/or photogrammetric software. Thus, for an end-user to 3-D print an object, for example, something they have seen on television or in a movie, the user may search the internet for publicly available 3-D printable files resembling the object of interest. Alternatively, for the user to create the 3-D printable model themselves, typically an original object may be scanned or photographed for digital modelling, or alternatively, may be created manually in CAD software before it can be printed by the 3-D printer.

Accordingly, tools and techniques for communication between an entertainment device and printing devices are provided.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1A:
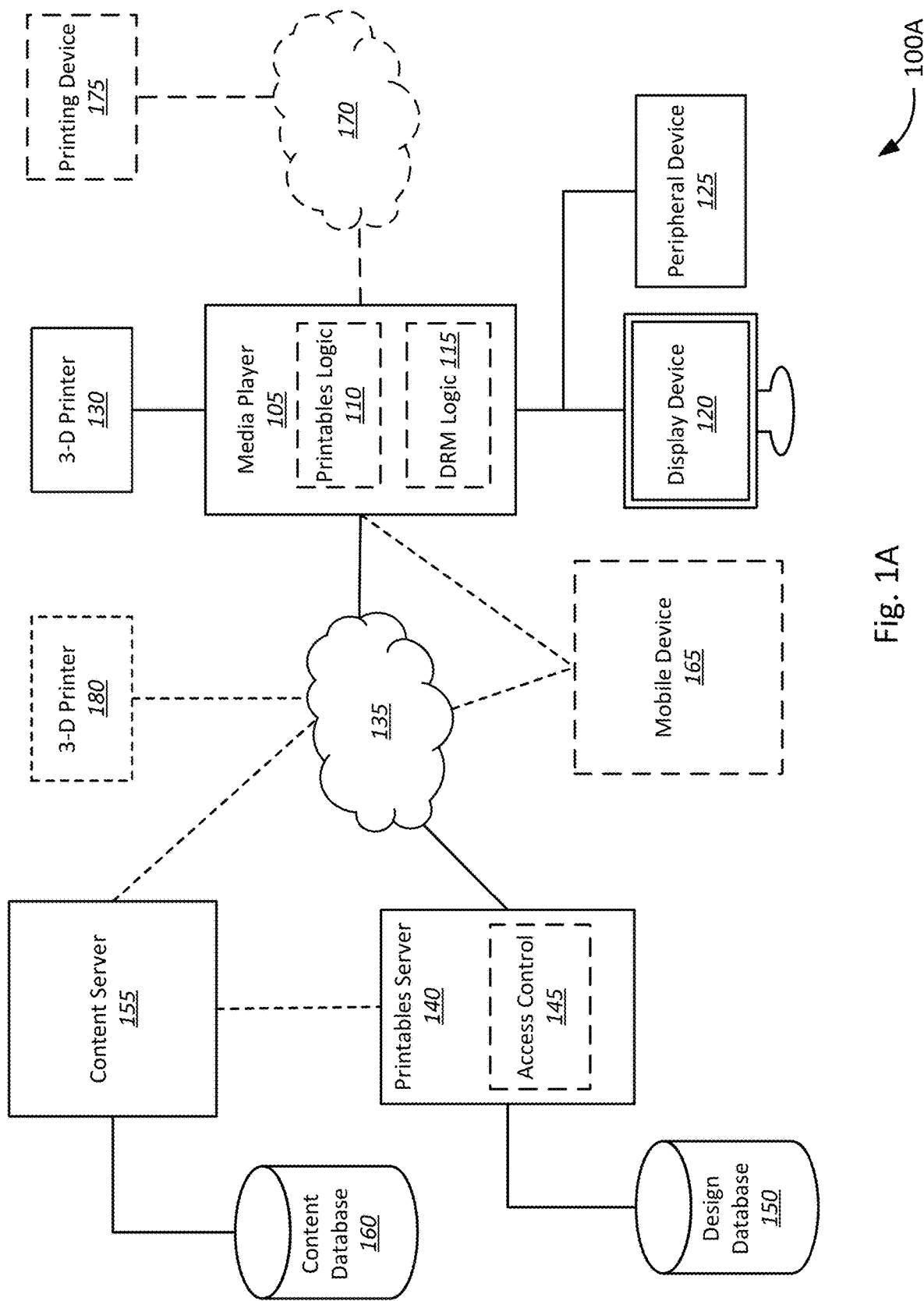
FIG. 1A is a block diagram of a system topology for entertainment device communication with printing devices, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for entertainment device communication with printing devices is provided. The system includes a printing device and a media player coupled to the printing device. The media player may include a processor, and a non-transitory computer readable medium comprising instructions executable by the processor to obtain a content stream including at least one of an audio stream or a video stream, the content stream further including a data stream including a trigger associated with a printable model. The instructions may further be executable to obtain a 3-D model file associated with the printable model responsive to an occurrence of the trigger, transmit at least one of the 3-D model file or printing instructions based on the 3-D model file to the printing device, and print, via the printing device, the printable model based on the 3-D model file. The printing device may be configured to receive at least one of the 3-D model file or printing instructions based on the 3-D model file from the media player via at least one of a wired or wireless connection to the media player.

In another aspect, an apparatus for entertainment device communication with printing devices is provided. The apparatus includes a processor, and a non-transitory computer readable medium comprising instructions executable by the processor to obtain a content stream including at least one of an audio stream or a video stream, the content stream further including a data stream including a trigger associated with a printable model. The instructions may further be executable to obtain a 3-D model file associated with the printable model responsive to an occurrence of the trigger, transmit at least one of the 3-D model file or printing instructions based on the 3-D model file to a printing device, and print, via the printing device, the printable model based on the 3-D model file.

In a further aspect, a method for communication between entertainment devices and printing devices is provided. The method includes obtaining, via a media player, a content stream including at least one of an audio stream or a video stream, the content stream further including a data stream including a trigger associated with a printable model. The method continues by obtaining, via the media player, a 3-D model file associated with the printable model responsive to an occurrence of the trigger. The method may continue by transmitting, via the media player, at least one of the 3-D model file or printing instructions based on the 3-D model file to a printing device, and printing, via the printing device, the printable model based on the 3-D model file.

Various modifications and additions can be made to the embodiments discussed without departing from the scope of the invention. For example, while the embodiments described above refer to specific features, the scope of this invention also includes embodiments having different combination of features and embodiments that do not include all the above described features.

Figure 1B:
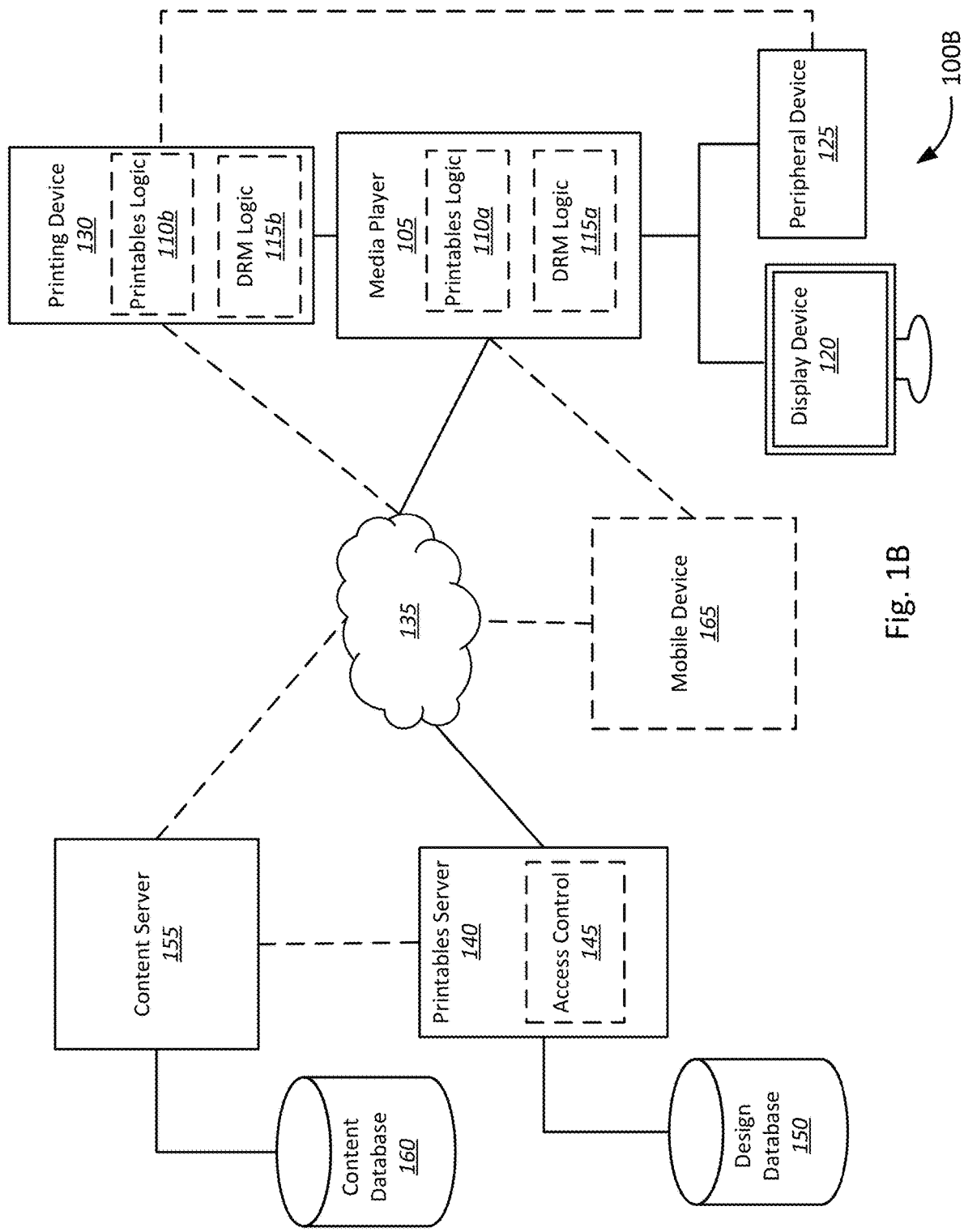
FIG. 1B is a block diagram of an alternative system topology for entertainment device communication with printing devices, in accordance with various embodiments.

FIGS. 1A & 1B are block diagrams of example topologies for systems 100A, 100B for entertainment device communication with printing devices, in accordance with various embodiments. With reference to FIG. 1A, the system 100A may include an entertainment device 105, printables logic 110, digital rights management (DRM) logic 115, display device 120, peripheral device 125, printing device 130, network 135, printables server 140, access control 145, design database 150, content server 155, content database 160, mobile device 165, local network 170, network printing device 175, and remote printing device 180. It should be noted that the various components of the system 100A and associated topologies are schematically illustrated in FIG. 1A, and that modifications to the architecture or topological arrangement of the system 100A may be possible in accordance with various embodiments.

In various embodiments, the media player 105 may include printables logic 110 and DRM logic 115. The media player 105 may be coupled to a display device 120, peripheral device 125, a printing device 130, a network printing device 175 via a local network 170, mobile device 165, or remote printing device 180. The media player 105 may further be communicatively coupled to a network 135 through which the media player 105 may communicate with the remote printing device 180. One or more of a printables server 140, content server 155, mobile device 165, and/or remote printing device 180 may thus be coupled to the media player 105 via the network 135. The printables server 140 may include access control 145 logic and/or hardware. The printables server 140 may be coupled to a design database 150. A mobile device 165 may be coupled to the media player 105 directly, or alternatively, via the network 135. The printing device 130 may be coupled directly to the media player 105. A network printing device 175 may be coupled to the media player 105 via a local network 170. A remote printing device 180 may be communicatively coupled to the media player 105 via the network 135. The content server may be coupled to the content database 160. The content server 155 may be communicatively coupled to the network 135. In some embodiments, the content server 155 may be coupled to the printables server 140 or media player 105 via the network 135. Alternatively, in some embodiments, the content server 155 may be coupled to the printables server 140 directly.

In various embodiments, the media player 105 may be implemented in hardware, software, or both hardware and software. The media player 105 may include, without limitation, one or more machine readable instructions, such as a computer program or application, a server computer hosting the software, a dedicated custom hardware, such as a single-board computer, field programmable gate array (FPGA), modified GPU, application specific integrated circuit (ASIC), or a system on a chip (SoC). In further embodiments, the media player 105 may further include a specifically targeted hardware appliance, or alternatively, a database-driven device that performs various functions via dedicated hardware as opposed to a central processing unit (CPU).

In various embodiments, the media player 105 may be configured to receive one or more of an audio stream, video stream, audiovisual (AV) stream, data stream, content stream including each of an audio stream, video stream, and data stream, or a trigger. Audio, video, and AV streams may include, without limitation, digital and/or analog streams for television programs and broadcasts, live events, movies, on-demand video content, live webcasts, and other media content. The audio, video, or AV streams may, in some embodiments, then be decoded by the media player 105 to be played or otherwise displayed on a display device 120. Thus, in various embodiments, the media player 105 may include various types of devices configured to play various forms of media. Suitable devices may include, without limitation, set top boxes, streaming media players, smart speakers, music players, compact disc (CD), digital video disc (DVD), or Blu-Ray disc (BD) players. Additionally, and/or alternatively, the media player 105 may be at least one of a mobile device, such as mobile device 165, a gaming console, a tablet, a laptop computer, or a desktop computer. The mobile device, gaming console, tablet, laptop computer, or desktop computer may have similar functionality as described with respect to the media player 105.

In various embodiments, the media player 105 may further be configured to receive a data stream accompanying the audio, video, or AV stream. The data stream may include metadata associated with the audio, video, or AV stream. For example, the data stream may include, without limitation, closed captioning (CC) data, electronic program guide (EPG) data, and other data associated with a television program, broadcast, live event, or movie. For example, other data may further include, without limitation, actor information, a plot synopsis, or event information (e.g., live scores or breaking news updates).

In various embodiments, the media player 105 may include printables logic 110, configured to perform various functions, as will be described below. Printables logic 110 may include computer readable media executable by a processor of the media player 105 to perform the various functions. For example, printables logic 110 may include one or more machine readable instructions configured to allow the media player 105 to obtain triggers, and trigger information as will be described in greater detail below. Printables logic 110 may further be configured to cause the media player 105 to print a printable model, prompt a user based on a trigger as will be described in greater detail below. The printables logic 110 may further be configured to cause the media player 105 to accept user inputs, and to obtain printable models, as will be described in greater detail below.

In various embodiments, the data stream may further include one or more triggers. Triggers may include information associated with a printable model. For example, a printable model may refer to a printable 3-D object. Accordingly, the trigger may include, without limitation, information regarding a 3-D model file readable by the media player 105 and/or a printing device 130 to print a 3-D object as specified by the 3-D model file. In some embodiments, the trigger may identify a 3-D model file, for example, located in design database 150. The trigger may further include information, such as a uniform resource locator (URL), from which the 3-D model file may be obtained. In yet further embodiments, the trigger may include a security token. The security token may be configured to authenticate and/or authorize the media player 105, or a user associated with the media player 105, to obtain, or alternatively be presented with the option to obtain, the printable model (e.g., a 3-D model file). For example, in some embodiments, a user associated with the media player 105 may order and/or purchase one or more printable models. Thus, a trigger may be transmitted to the media player 105, which may include a security token authorizing the media player 105 to further obtain a 3-D model file associated with the printable model. Alternatively, in some embodiments, the trigger may be configured to cause the media player 105 to present the user with an option to obtain a printable model. The security token, in this example, may authenticate and authorize the information associated with the printable model to be presented to the user.

In some embodiments, the trigger may further be associated with one or more of the audio, video, or AV stream. For example, in some embodiments, the trigger may further be configured to include a timestamp associated with the audio, video, or AV stream. A timestamp may indicate a time in the audio, video, or AV stream, or when an event should occur. Thus, in some embodiments, a media player 105 may be configured to determine whether a trigger, or an event associated with the trigger, has occurred based on the timestamp of the audio, video, or AV stream being reached. The trigger may, in turn, be configured to cause a printable model to be obtained when a timestamp associated with the audio, video, or AV stream is reached while playing the audio, video, or AV stream. In further embodiments, the trigger may be configured to prompt the user regarding whether the user would like to print a printable model, for example, when the timestamp has been reached. In some embodiments, the prompt may include, without limitation, text, a button, popup, window, or other object which may inform the user to take an action to cause a printable model to be printed or obtained.

In other embodiments, the trigger may be applied asynchronous to the one or more of the audio, video, or AV stream. For example, a provider, such as, without limitation, a streaming service provider, content provider, or internet service provider may initiate a trigger for a printable model. The printable model may or may not be related to the content being streamed by a user at the time the trigger occurs. In some embodiments, the trigger may occur at any time during the stream. For example, in some embodiments, the trigger may cause a video, image, audio, or text associated with a printable model to be played, overlaid, superimposed, or otherwise appear over the one or more of the audio, video, or AV stream. In other embodiments, the one or more of the audio, video, or AV stream may be paused and the video, image, audio, or text associated with the trigger and/or printable model may be played or displayed.

In some further embodiments, the trigger may be configured to allow the media player 105 to identify a character or object being displayed in the video stream, and to allow a user of the media player 105 to select a character or object to be printed as a printable object. Thus, the trigger may further be associated with characters and/or objects (e.g., data) contained within audio, video, or AV stream. For example, the trigger may include pixel information identifying a location of a character or an object in relation to what is being displayed on display device 120. The media player 105 may, in some embodiments, be configured to make characters and/or objects displayed on the display device 120 selectable by the user during certain parts of the audio, video, or AV stream, based on the trigger. For example, the trigger may include pixel or video information which may, for example, be superimposed, overlaid, or combined with the video stream to be displayed by the display device. In some embodiments, a user may select a character and/or object to print via a peripheral device 125. In yet further embodiments, the timestamp may further indicate when the media player 105 should make characters and/or objects selectable. Accordingly, the media player 105 may be configured to output an audio, video, or audiovisual signal to the display device 120. Furthermore, in various embodiments, the media player 105 may be configured to modify the audiovisual signal based on the trigger to include information about at least one 3-D printable object relative to the video stream.

Accordingly, in some embodiments, the media player 105 may be configured to receive an audio, video, or AV stream separately from a data stream including one or more triggers. In some examples, the media player 105 may further be configured to combine the audio, video, or AV stream with the data stream including the one or more triggers to produce a content stream that may be displayed by the display device 120. In other embodiments, the media player 105 may be configured to receive a content stream including an audio, video, or AV stream and a data stream including the one or more triggers. Thus, the content stream may be transmitted to the media player 105 by a content server 155 or the printables server 140. In some embodiments, the media player 105 may be configured to extract, or otherwise obtain, the one or more triggers from the content stream.

Once it has been determined to print a printable object, information from the trigger, referred to herein as trigger information, may be transmitted over network 135 to a printables server 140 to obtain a printable model. Thus, the trigger information may further include identifying information for a particular printable model, allowing the printables server 140 to identify the printable model (e.g., a 3-D model file). As previously described, the trigger may further include authentication information, such as a security key, allowing the printables server 140 to authorize the media player to obtain a requested printable model specified in the trigger information.

In some embodiments, the mobile device 105 may be configured to transmit the security key to a mobile device 165, such as, for example, a mobile phone. The mobile device 165 may, in turn, be configured to interact with a printing device 130, 175, 180. In some examples, the printing device 130, 175, 180 may be a local device belonging to a customer. In other examples, the printing device 130, 175, 180 may be remotely located in a store, kiosk, vendor warehouse facility, store front, or other location to which the customer may travel to print or otherwise obtain the printable model.

Once the printable model has been obtained, the media player 105 may further be configured to transmit the printable model (e.g., a 3-D model file) to a printing device 130. Accordingly, in various embodiments, the media player 105 may be communicatively coupled to a printing device 130, and configured to cause the printing device 130 to print a printable model. Thus, printables logic 110 may further be configured to interface the media player 105 with various other system components, such as a printables server 140, content server 155, display device 120, peripheral device 125, and printing device 130.

In some embodiments, the trigger could also include information to route a 3-D model file to a specific printing device, directly without using a mobile device, to authorize and initiate printing, for example, via media player 105, so that the printable model is printed at a distribution location where the customer would pick up the printable model. In further examples, the trigger could contain further trigger information about the customer's preferences regarding a shipping address that the distribution site where the printable model is printed can ship the printable model once it has been printed. Thus, in various some embodiments, the trigger information may include address information for a user or customer. In yet further embodiments, the trigger may include address information for specifically targeted customers. In some embodiments, the media player may be configured to retrieve shipping information for the customer from, for example, a profile database based, at least in part, on the trigger information.

In yet further embodiments, the media player 105 may be configured to dynamically generate printable models. For example, in some embodiments, the printables logic 110 may include further instructions executable by a processor of the media player 105 to dynamically generate a 3-D model file based on one or more images of the video stream. In further embodiments, the media player 105 may be configured to customize a printable model, or alternatively obtain a customized 3-D model file, based on inputs received from a user of the media player. For example, the media player 105 may be configured to receive a user input indicative of one or more user customizations of the printable model. User customizations may include, without limitation, colors, size, poses or positions of a character, types of clothing and accessories, facial expressions, text or other alphanumeric characters to be printed with the printable model, or other features affecting the appearance of a printable model.

In yet further embodiments, the media player 105 and/or printing device 130 may further be configured to receive input via the mobile device 165. The mobile device 165 may include, without limitation, mobile phones, tablet computers, smart watches or accessories, or other devices which may or may not be peripherally attached to the media player 105. For example, in some embodiments, the mobile device 165 may be configured to directly communicate with the media player 105, for example, via a wired or wireless connection. In some other embodiments, the mobile device 165 may be configured to communicate with the media player 105 via a communications network, such as network 135. Thus, in some embodiments, the mobile device 165 may be configured to cause the media player 105 to play at least one of an audio, video, AV, data, or a content stream to be played on the display device 120. In various embodiments, the media player 105 and/or printing device 130 may further be configured to receive direct input and/or input via the mobile device 165, as described above with respect to the peripheral device 125, from a user indicative of a desire to obtain and print a printable model, to provide selections of user customizations of the printable model, to provide authentication and/or authorization information (e.g., login information, payment information, etc.), etc. Thus, a user may, through the mobile device 165, provide inputs to the media player 105 and/or printing device 130 to cause a printable model to be obtained and printed. In yet further embodiments, the media player 105 may include the mobile device 165. Accordingly, in some examples, the mobile device 165 may be configured to purchase or otherwise obtain a printable model as described herein with respect to the media player 105. In further examples, the mobile device 165 may further transmit authorization information to a respective printing device 130, 175, 180, as described with respect to the media player 105 in greater detail below. In one example, the mobile device 165 may be configured to obtain a printable model and communicate authorization information directly to a printing device 130, 175, 180 wirelessly, including, without limitation, through near-field communication (NFC), Bluetooth, through a direct Wi-Fi connection, through a wireless network connection (e.g., to a router or access point, network 180), or through a cellular network or other external network (e.g., network 135).

In various embodiments, the media player 105 may further include DRM logic 115. Like the printables logic 110, the DRM logic 115 may include computer readable media executable by a processor of the media player 105 to perform the various functions to authenticate and/or authorize a user or media device 105 to obtain printable models as described above. For example, DRM logic 115 may include one or more machine readable instructions configured to authenticate and/or authorize a user and/or media player 105 to obtain printable models, such as a 3-D model file, via the printables server 140 and/or design database 150. Thus, the DRM logic 115 may include instructions to obtain a security token, as previously described, from a trigger, and transmitting the security token to a printables server 140. The DRM logic 115 may further include instructions to determine whether a printable model (e.g., a 3-D model file) received form the printables server 140 was purchased or otherwise authorized to be received by the media player 105. DRM logic 115 may further be configured to cause the media player 105 to receive an audio, video, AV, data, or content stream in the first place. Thus, the DRM logic 115 may authenticate and authorize a user to access a content stream based, for example, on an authorized purchase of the content, and in some examples, any associated printable models. Techniques for authentication and authorization may include various techniques known to those skilled in the art. For example, in some embodiments, a user of the media player 105 may be authenticated and/or authorized via identity-based (e.g., tokens, digital certificates, signatures, etc.) or knowledge-based (e.g., username and password, personal identification number (PIN), etc.) techniques.

As previously described, the media player 105 may be configured to cause at least one of an audio, video, AV, data, or a content stream to be played on the display device 120. In some embodiments, the display device 120 may be configured to receive and play an audio and/or video signal. In further embodiments, the display device 120 may further be configured to decode an audio, video, AV, data, or content stream directly. Accordingly, the display device 120 may include, without limitation, a television, monitor, one or more speakers, projector, mobile device screen, and other devices capable of displaying images, video, and/or sound. In various embodiments, the media player 105 may further be configured to receive an input from a user indicative of a response to a trigger (e.g., a prompt). For example, in some embodiments, a user may provide an input via the peripheral device 125 to indicate whether to obtain and print a printable model, to provide selections of user customizations of the printable model, to provide authentication and/or authorization information (e.g., login information, payment information, etc.), and other inputs that may be required to provide a response based on the trigger. Thus, the peripheral device 125 may include, without limitation, a remote control, keyboard, mouse, microphone, camera, or other attached device. In yet further embodiments, the user input may be provided directly via the display device 120. For example, the display device 120 may include a touchscreen display through which the user may interact with and provide inputs to the media player 105.

In various embodiments, the media player 105 may be communicatively coupled to a printables server 140 and/or content server 155 via network 135. Network 135 may include networks that can support data communications using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™ IPX™, AppleTalk™, and the like. The network 135 may be a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

In various embodiments, the printables server 140 may be configured to provide the one or more triggers, for example, as part of a data stream to the media player 105. In some embodiments, the printables server 140 may be configured to directly transmit a data stream, including one or more triggers, to the media player 105. In other embodiments, the printables server 140 may provide the data stream to a content server 155 to be combined with a audio, video, or AV stream, which may in turn be transmitted by the content server 155 to the media player 105. In further embodiments, the printables server 140 may be configured to determine whether the one or more triggers should be provided to the media player 105 in the first place. For example, the printables server 140 may include access control 145 logic. The access control 145 may be configured to determine whether a media player 105 has ordered, requested, or otherwise obtained access to one or more printable models associated with streaming media content, for example, a television program (e.g., a television show, a home-shopping broadcast, commercial or infomercial, etc.), movie, or live event. For example, in some embodiments, when ordering or otherwise viewing streaming media content from the media device 105, a user may be presented with an option to purchase, obtain, or alternatively given the option to select, one or more printable models associated with, for example, a character in a movie or show, an actor, an athlete playing in a sporting event, an object (e.g., a ball, a vehicle, spaceship, etc.), or a scene in a movie. The printables server 140, in some embodiments, may generate one or more triggers for printable models, based on a user selection. In other embodiments, the printables server 140 may receive one or more triggers for available printable models associated with the streaming media content based on information provided by a streaming service provider, content distributor/publisher, or a third party. Alternatively, the printables server 140 may dynamically generate one or more triggers based on the streaming media content. For example, the printables server 140 may be able to identify objects and character in a movie, for example, and dynamically generate one or more triggers associated with the object or character identified.

In yet further embodiments, printable models, and associated triggers, may be available for other types of digital media, such as e-books, audiobooks, podcasts, catalogs, EPGs, video games, among others. Triggers may be associated with the data in the other types of digital media similarly to an audio, video, or AV stream. For example, a trigger may indicate a page or passage of an e-book in which to prompt a user whether they would like to obtain a printable model for a character in the book.

In some embodiments, the printables server 140 may be configured to receive an audio, video, or AV stream from a content server 155. The audio, video, or AV stream may be obtained, by the printables server 140, directly from the content server 155, or alternatively, via the network 135. In some embodiments, the printables server 140 may be configured to combine the audio, video, or AV stream, with a data stream including the one or more triggers, to generate a content stream including both the audio, video, or AV stream associated with a streaming media content, and the one or more triggers. The printables server 140 may further be configured to transmit the content stream, via the network 135, to the media player 105.

Alternatively, the printables server 140 may provide the data stream including the one or more triggers to the content server 155. The content server 155 may in turn be configured to combine the one or more triggers with one or more of an audio, video, or AV stream to generate a content stream. The content server 155 may in turn provide the content stream including the one or more triggers to the media player 105 via the network 135. The content server 155 may be configured to obtain one or more of the audio, video, or AV stream from the content database 160. Accordingly, the content server 155 may be configured to provide the one or more triggers to the media player 105. In some further embodiments, the content server 155 may be coupled to one or more of the content database 160 and design database 150. Alternatively, the printables server 140 may be coupled to one or more of the content database 160 and design database 150.

In yet further embodiments, the system 100A may include a single, combined server comprising both the content server 155 and printables server 140. The combined server may be coupled to both the content database 160 and the design database 150, and configured to provide both audio, video, AV stream, data stream, and one or more triggers to the media device 105. In various embodiments, the printables server 140 may be configured to receive a user input from media device 105, via the network 135, indicative of a printable model. Based on the user input, the printables server 140 may be configured to obtain a printable model (e.g., a 3-D model file) from the design database 150 based on a selection by the user of the media player 105. Thus, the printables server 140 may be configured to determine a printable model to obtain from the design database 150, based at least in part on information contained within the one or more triggers, and a user response indicative of a user selection of the printable model. The printables server 140 may then be configured to transmit the printable model to the media player 105 via the network 135.

The access control 145 may include, for example, an API for accessing various resources, such as printable models (e.g., 3-D model files) from the design database 150. For example, the API may be configured to interface between the printables server 140 and one or more of the content server 155 or media player 105. For example, the access control 145 may be configured to receive inputs from the media player 105 and facilitate communications between the media player 105 and the printables server 140. The access control 145, for example, may be configured to receive trigger information selected by a user associated with the media player 105. For example, when one or more triggers occur or cause a user to be prompted, information in a respective trigger associated with a printable model may be transmitted by the media player 105 to the printables server 140 via the access control 145. The media player 105 may further be configured to transmit, via the access control 145, one or more user customizations to the printable model, as previously described. In various embodiments, the access control 145 may be configured to determine a respective printable model to obtain, and user customizations to be made to the respective printable model. In some embodiments, the access control 145 may be configured to allow user customizations to be selected, and in some examples, applied to a printable model. For example, the access control 145 may be configured to allow the media player 105 to modify a 3-D model file with the user customizations selected by a user.

In further embodiments, the access control 145 may be configured to authenticate a user and/or the media player 105 and authorize the user and/or media player 105 to access the design database 150, and obtain a printable model (e.g., a 3-D model file) from the design database 150. Once a printable model has been obtained from the design database 150, the printables server 140 may be configured to transmit the printable model, for example, by transmitting a 3-D model file of the printable model with any applied user customizations, to the media player 105. Thus, once the media player 105 receives, for example, a 3-D model file, the media player 105 may be configured to print the printable model via the printing device 130.

In some examples, the access control 145 may only authorize a user and/or the media player 105 to print the 3-D model file of the printable model for a limited period of time. In other words, the authorization to print the 3-D model file of the printable model may expire after a predetermined amount of time (e.g., after 5 minutes, after 30 minutes, after an hour, after a day, after a week, etc.). In some examples, if a user and/or media player 105 do not print the 3-D model within the predetermined period of time, the user and/or media player 105 may have to re-order the 3-D model file and/or re-request the authorization to print the 3-D model file.

In various embodiments, the media player 105 may be configured to communicate with one or more of the printing device 130, network printing device 175, or remote printing device 180. In some embodiments, the printables logic 110 of the media player 105 may include instructions, executable by the media player 105 to communicate with the one or more of the printing device 130, network printing device 175, or remote printing device 180.

For example, in some embodiments, the printing device 130 may be a local printing device directly coupled to the media player 105. In some examples, the printing device 130 may be coupled to the media player 105 via a direct wired or wireless connection. For example, suitable connections may include a connection via various communication media, such as a universal serial bus (USB) connection or other serial connection, an Ethernet connection, a Bluetooth™ connection, a direct Wi-Fi connection (e.g., 802.11 suite of communication protocols), or infrared (IR).

Similarly, in some embodiments, the network printing device 175 may be communicatively coupled to the media player 105 via a local network 170. The network printing device 175 may be coupled to the local network 170 via a wired or wireless connection, such as via an Ethernet connection, or a Wi-Fi connection (e.g., utilizing the 802.11 suite of communication protocols). The local network 170 may include a local area network, or a virtual private network (VPN) through which the media player 105 may communicate with an access the network printing device 175.

In further embodiments, a remote printing device 180 may further be communicatively coupled to the media player 105 via the network 135. The remote printing device 180 may be remotely accessible by the media player 105 via the network 135. For example, the remote printing device 180 may be accessible by the media player 105 via the Internet or other network connection. In yet further embodiments, the media player 105 may be configured to communicate with a remote server, such as, in some examples, the printables server 140, wherein the remote server is configured to communicate with the remote printing device 180.

The printing device 130, network printing device 175, and remote printing device 180 may include various types of printers and machining devices. For example, the printing device 130, network printing device 175, and remote printing device 180 may include, without limitation, a 3-D printer, computer numerical control (CNC) machines (e.g., CNC mills, lathes, and cutters), selective laser sintering (SLS) machines, and ink printers (e.g., laser and inkjet printers).

Accordingly, in various embodiments, the media player 105 may be configured to communicate with the printing device 130, network printing device 175, or remote printing device 180. In some embodiments, the printables logic 110 of the media player 105 may include instructions executable by the media player 105, to further communicate with the printing device 130, network printing device 175, or remote printing device 180, and to print printable models. Thus, the media player 105 may be configured to communicate with the printing device 130, network printing device 175, or remote printing device 180, and in some examples, to print printable models or other items on demand.

As previously described, in various embodiments, the media player 105 may be configured to obtain a printable model, for example, by obtaining a 3-D model file. In some embodiments, the media player 105 may be configured to transmit the 3-D model file to one or more of the printing device 130, network printing device 175, or remote printing device 180. The 3-D model file, for example, may include without limitation an STL, 3MF, or other similar printable format. In some embodiments, printables logic 110 may, therefore, include instructions executable by the media player 105 to obtain and transmit the 3-D model file to an appropriate printing device 130, 175, 180. In some embodiments, the 3-D model file may be stored remotely, for example, in design database 150, and obtained from the design database 150, via the printables server 140, by the media player 105 as previously described. In alternative embodiments, the media player 105 may be configured to receive each of the 3-D model files associated with respective triggers in the data stream. In some embodiments, the data stream itself may include one or more 3-D model files. Accordingly, the printables logic 110 may include instructions executable by the media player 105 to obtain 3-D model files from the data stream and store them locally, for example, on a local storage device or file system. The triggers in the data stream may, in turn, be configured to reference and/or link parts of the audio, video, or AV stream to the 3-D model file.

Accordingly, in some embodiments, upon the occurrence of a trigger, for example, reaching a timestamp associated with a respective 3-D model file, the media player 105 may identify that the trigger has occurred, determine the appropriate 3-D model file associated with the trigger, and transmit the 3-D model file to an appropriate printing device 130, 175, 180. For example, in some embodiments, the media device 105 may be configured to transmit the 3-D model file directly to the printing device 130. In some embodiments, the media device 105 may be configured to transmit the 3-D model file over a local network, such as network 170, to the network printing device 175. In further embodiments, the media player 105 may be configured to transmit the 3-D model file, over the network 135, to the remote printing device 180.

In further, alternative embodiments, each of the printing devices 130, 175, 180 may be configured to obtain the 3-D model files, upon instruction from the media player 105. For example, in some embodiments, the printing devices 130, 175, 180 may be configured to request the 3-D model files from the media player 105, or to obtain 3-D model files from local storage at the media player 105. In further embodiments, the printing device 130, 175, 180 may be configured to obtain 3-D model files from the printables server 140 and/or design database 150.

In yet further embodiments, the printables logic 110 may be configured to allow the media player 105 to communicate with the mobile device 165, and to receive instructions, from the mobile device, to communicate with the one or more of the printing device 130, network printing device 175, or remote printing device 180 as previously described.

FIG. 1B is a block diagram of an alternative topology for a system 100B for entertainment printables, in accordance with various embodiments The system 100B may include a media player 105, printables logic 110a and/or 110b (collectively, printables logic 110b), digital rights management ("DRM") logic 115a and/or 115b (collectively, DRM logic 115), display device 120, peripheral device 125, printing device 130, network 135, printables server 140, access control 145, design database 150, content server 155, content database 160, and mobile device 165. It should be noted that the various components of the system 100B and associated topologies are schematically illustrated in FIG. 1B, and that modifications to the architecture or topological arrangement of the system 100B may be possible in accordance with various embodiments.

In various embodiments, the media player 105 may include printables logic 110a and DRM logic 115a. Additionally and/or alternatively, the printable logic 110b and the DRM logic 115b may be incorporated into the printing device 130. The media player 105 may be communicatively coupled to a display device 120, peripheral device 125, a printing device 130, and optionally, a mobile device 165. The media player 105 may further be communicatively coupled to a network 135. Additionally and/or alternatively, the printing device 130 may be communicatively coupled to peripheral device 120 and/or network 135. One or more of a printables server 140, or a content server 155 may be coupled to the media player 105 and/or printing device 130 via the network 135. The printables server 140 may include access control 145 logic and/or hardware. The printables server 140 may be coupled to a design database 150. The content server 155 may be coupled to a content database 160. The printables server 140 and/or the content server 155 may be communicatively coupled to the network 135. In some embodiments, the content server 155 may be communicatively coupled to the printables server 140, media player 105, and/or printing device 130 via the network 135. Alternatively, in some embodiments, the content server 155 may be communicatively coupled to the printables server 140 directly. Each of these communicative couplings may be achieved via at least one of a wireless and/or wired connection.

As previously described with respect to FIG. 1A, the media player 105 may alternatively be at least one of a mobile device, including mobile device 165, a gaming console, a tablet, a laptop computer, or a desktop computer. The mobile device, gaming console, tablet, laptop computer, or desktop computer may have similar functionality as described below with respect to the media player 105. In various embodiments, the media player 105 may be configured to receive a data stream accompanying the audio, video, or AV stream. The data stream may include metadata associated with the audio, video, or AV stream. For example, the data stream may include, without limitation, closed captioning (CC) data, electronic program guide (EPG) data, and other data associated with a television program, broadcast, live event, or movie. For example, other data may further include, without limitation, actor information, a plot synopsis, or event information (e.g., live scores or breaking news updates). Additionally and/or alternatively, the data stream may comprise information associated with a printable model and/or a printable model file. The printable model may be a 3-D printable model.

In some embodiments, the printing device 130 may be a printer that is operable to print 3-D objects. Additionally and/or alternatively, the printing device 130 may be a CNC laser that is operable to carve a 3-D object. In additional embodiments, the printing device 130 may receive a printable model file and/or information associated with a printable model via the media player 105, via a peripheral device 125, or via direct user input.

In various embodiments, the media player 105 and/or printing device 130 may include printables logic 110, configured to perform various functions, as will be described below. Printables logic 110 may include computer readable media executable by a processor of the media player 105 to perform the various functions. For example, printables logic 110 may be configured to cause the media player 105 and/or printing device 130 to print a printable model. The printables logic 110 may further be configured to cause the media player 105 and/or printing device 130 to accept user inputs indicating a desire to print a printable model and to obtain printable models from the design database 150.

In various embodiments, the data stream accompanying the audio, video, or AV stream received by the media player 105 may further include information associated with a printable model. For example, a printable model may refer to a printable 3-D object. Accordingly, the information associated with the 3-D printable model may include, without limitation, the printable model file and/or information regarding a 3-D model file readable by the media player 105 and/or a printing device 130 to print a 3-D object as specified by the 3-D model file.

In some embodiments, the information associated with a printable model may identify a 3-D model file, for example, located in design database 150. The information associated with a printable model may further include information, such as a uniform resource locator (URL), from which the 3-D model file may be obtained.

In yet further embodiments, the information associated with a printable model may include a security token. The security token may be configured to authenticate and/or authorize the media player 105, printing device 130, and/or a user associated with the media player 105 and/or printing device 130, to obtain, or alternatively be presented with the option to obtain, the printable model (e.g., a 3-D model file). For example, in some embodiments, a user associated with the media player 105 may order and/or purchase one or more printable models. Thus, the order may be transmitted to the media player 105 and/or printing device 130, which may include a security token authorizing the media player 105 to further obtain a 3-D model file associated with the printable model. Alternatively, in some embodiments, the information associated with a printable model may be configured to cause the media player 105 and/or printing device 130 to present the user with an option to obtain a printable model. The security token, in this example, may authenticate and authorize the information associated with the printable model to be presented to the user.

In some cases, the authorization for a user, the media play 105, and/or the printing device 130 to print the 3-D model file of the printable model may only last for a limited period of time. In other words, the authorization to print the 3-D model file of the printable model may expire after a predetermined amount of time (e.g., after 5 minutes, after 30 minutes, after an hour, after a day, after a week, after the media content has ended, 5 minutes after the media content has ended, a day after the media content has ended, etc.). If a user, media player 105, and/or printing device 130 do not print the 3-D printable model within the predetermined period of time, the user, media player 105, and/or printing device 130 may have to re-order the 3-D model file and/or re-request the authorization to print the 3-D model file.

Additionally and/or alternatively, the security token may be used to decrypt an encrypted printable model file. A user, media player 105, and/or printing device 130 may receive the security token when the user purchases or orders the 3-D printable model. Upon verification by the media player 105 and/or printing device 130 that a user purchased the 3-D printable model and is authorized to print a printable model, the media player 105 and/or printing device 130 may use the security token to decrypt the printable model file.

In some embodiments, the information associated with a printable model may cause the media player 105 and/or the printing device 130 to automatically print the 3-D printable model when a timestamp associated with the streaming audio, video, or AV content is reached. In other embodiments, the information associated with a printable model may be configured to prompt the user, on display screen 120, regarding whether the user would like to print a printable model. In some embodiments, the prompt may include, without limitation, text, a button, popup, window, or other object which may inform the user to take an action to cause a printable model to be printed or obtained.

Once the media player 105 and/or printing device 130 determines that a printable object should be printed, the media player 105 and/or printing device 130 may use the information associated with a printable model to request a 3-D printable model from printables server 140. Thus, the information associated with a printable model and/or the request sent by the media player 105 and/or printing device 130 may further include identifying information for a particular printable model, allowing the printables server 140 to identify the printable model (e.g., a 3-D model file). As previously described, the information associated with a printable model and/or the request sent by the media player

105 and/or 3-D printer may further include authentication information, such as a security key or token, allowing the printables server 140 to authorize the media player 105 and/or printing device 130 to obtain a requested printable model specified in the information associated with a printable model.

Once the printable model has been obtained, the media player 105 may further be configured to transmit the printable model (e.g., a 3-D model file) to a printing device 130. Additionally and/or alternatively, the printable model (e.g., a 3-D model file) to a printing device 130 may be transmitted to the 3-D printer directly via network 135. Accordingly, in various embodiments, the media player 105 may be communicatively coupled to a printing device 130, and configured to cause the printing device 130 to print a printable model. Alternatively, the 3-D printer may be configured to print the printable model without additional input from media player 105. Thus, printables logic 110 may further be configured to interface the media player 105 and/or printing device 130 with various other system components, such as media player 105, printables server 140, content server 155, display device 120, peripheral device 125, and the printing device 130.

In yet further embodiments, the media player 105 may be configured to dynamically generate printable models. For example, in some embodiments, the printables logic 110 may include further instructions executable by a processor of the media player 105 to dynamically generate a 3-D model file based on one or more images of the video stream. In further embodiments, the media player 105 may be configured to customize a printable model, or alternatively obtain a customized 3-D model file, based on inputs received from a user of the media player. For example, the media player 105 may be configured to receive a user input indicative of one or more user customizations of the printable model. User customizations may include, without limitation, colors, size, poses or positions of a character, types of clothing and accessories, facial expressions, text or other alphanumeric characters to be printed with the printable model, or other features affecting the appearance of a printable model.

In various embodiments, the media player 105 and/or the printing device 130 may further include DRM logic 115. Like the printables logic 110, the DRM logic 115 may include computer readable media executable by a processor of the media player 105 and/or printing device 130 to perform the various functions to authenticate and/or authorize a user, media device 105, and/or printing device 130 to obtain printable models as described above. For example, DRM logic 115 may include one or more machine readable instructions configured to authenticate and/or authorize a user and/or media player 105 to obtain printable models, such as a 3-D model file, via the printables server 140 and/or design database 150. The DRM logic 115 may further include instructions to determine whether a printable model (e.g., a 3-D model file) received form the printables server 140 was purchased or otherwise authorized to be received by the media player 105 and/or printing device 130. Thus, the DRM logic 115 may include instructions to obtain a security token (which may be received based on a verified purchase of content or a printable model file) and transmit the security token to a printables server 140.

The security token transmitted from the user, media player 105 and/or printing device 130 may only authorize a user, the media play 105, and/or the printing device 130 to print the 3-D model file of the printable model for a limited period of time. In other words, the security token to print the 3-D model file of the printable model may expire after a predetermined amount of time (e.g., after 5 minutes, after 30 minutes, after an hour, after a day, after a week, after the media content has ended, 5 minutes after the media content has ended, a day after the media content has ended, etc.). If the user, the media play 105, and/or the printing device 130 do not print the 3-D model within the predetermined period of time, the user, the media play 105, and/or the printing device 130 may have to re-transmit a new security token, re-order the 3-D model file, and/or re-request the authorization to print the 3-D model.

Additionally and/or alternatively, upon verification that a user is authorized to print a printable model, a security token may be transmitted to the media player 105 and/or printing device 130 from at least one of a content provider, a service provider, or a printable server 140. The printables server 140 and/or design database 150 may also transmit an encrypted 3-D model file to media player 105 and/or printing device 130 and the security token may be used by the DRM logic 115 of the media player 105 and/or printing device 130 to decrypt the 3-D model file and print the printable model.

The DRM logic 115 may further be configured to cause the media player 105 to receive an audio, video, AV, data, or content stream in the first place. Thus, the DRM logic 115 may authenticate and authorize a user to access a content stream based, for example, on an authorized purchase of the content, and in some examples, any associated printable models.

Techniques for authentication and authorization may include various techniques known to those skilled in the art. For example, in some embodiments, a user of the media player 105 and/or printing device 130 may be authenticated and/or authorized via identity-based (e.g., tokens, digital certificates, signatures, etc.) or knowledge-based (e.g., username and password, personal identification number (PIN), etc.) techniques.

In additional embodiments, the DRM logic 115 may further be configured to cause the printing device 130 to embed a unique identifier into the 3-D printable model. The unique identifier may be included in the 3-D model file received from the media player 105, the printables server 140, the design database 150, or the user. The unique identifier may be used to indicate that a user purchased or was otherwise authorized to print the 3-D printable model. The unique identifier may be encrypted within the 3-D model file and the security token may be used by the media player 105 and/or the printing device 130 to decrypt the unique identifier to embed onto the 3-D printable model.

Before the model is printed, the integrity of the model file may be checked to ensure that the model file has not been tampered with to by-pass DRM. Media player 105 and/or printing device 130 may check the model file to ensure a user has not by-passed DRM. In a non-limiting example, the security token from the media player 105 and/or printing device 130 may be checked against the security token transmitted from the content provider, a service provider, or a printable server 140 to ensure that they are consistent with one another. Additionally and/or alternatively, the security token from the media player 105 and/or printing device 130 may be used to decrypt the security token transmitted from the content provider, a service provider, or a printable server 140.

If the media player 105 and/or printing device 130 cannot decrypt the unique identifier, determines that a user is not authorized to print a printable model, or determines that the 3-D model file has been tampered with to by-pass DRM, the media player 105 and/or printing device 130 may send an indication to the printables server 140, a service provider, and/or a content provider indicating the unauthorized printing of the 3-D printable model.

Additionally and/or alternatively, the DRM logic 115 may provide options to a user to customize one or more printed 3-D objects. For example, when a user orders a 3D-printed object, the user may also embed personal identification information within the 3-D model either on the surface or sub-surface using any of the techniques identified below, with respect to FIG. 2. The personal identification information may be added to the 3-D object file by at least one of the media player 105, the printing device 130, the printables server 140, and/or the design database 150. The 3-D object may then be printed by the printing device 130 with the personal identification information.

As previously described, the media player 105 may be configured to cause at least one of an audio, video, AV, data, or a content stream to be played on the display device 120. In some embodiments, the display device 120 may be configured to receive and play an audio and/or video signal. In further embodiments, the display device 120 may further be configured to decode an audio, video, AV, data, or content stream directly. Accordingly, the display device 120 may include, without limitation, a television, monitor, one or more speakers, projector, mobile device screen, and other devices capable of displaying images, video, and/or sound.

In various embodiments, the media player 105 and/or printing device 130 may further be configured to receive direct input and/or input via the peripheral device 125 from a user indicative of a desire to obtain and print a printable model, to provide selections of user customizations of the printable model, to provide authentication and/or authorization information (e.g., login information, payment information, etc.), etc. The peripheral device 125 may include, without limitation, a remote control, keyboard, mouse, microphone, camera, a computer, or another attached device. In yet further embodiments, the user input may be provided directly via the display device 120. For example, the display device 120 may include a touchscreen display through which the user may interact with and provide inputs to the media player 105 and/or printing device 130.

In yet further embodiments, the media player 105 and/or printing device 130 may further be configured to receive input via the mobile device 165. The mobile device 165 may include, without limitation, mobile phones, tablet computers, smart watches or accessories, or other devices which may or may not be peripherally attached to the media player 105. For example, in some embodiments, the mobile device 165 may be configured to directly communicate with the media player 105, for example, via a wired or wireless connection. In some other embodiments, the mobile device 165 may be configured to communicate with the media player 105 via a communications network, such as network 135. Thus, in some embodiments, the mobile device 165 may be configured to cause the media player 105 to play at least one of an audio, video, AV, data, or a content stream to be played on the display device 120. In various embodiments, the media player 105 and/or printing device 130 may further be configured to receive direct input and/or input via the mobile device 165, as described above with respect to the peripheral device 125, from a user indicative of a desire to obtain and print a printable model, to provide selections of user customizations of the printable model, to provide authentication and/or authorization information (e.g., login information, payment information, etc.), etc. Thus, a user may, through the mobile device 165, provide inputs to the media player 105 and/or printing device 130 to cause a printable model to be obtained and printed.

In various embodiments, the media player 105 and/or printing device 130 may be communicatively coupled to a printables server 140 and/or content server 155 via network 135. Network 135 may include networks that can support data communications using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA, IPX, AppleTalk, and the like. The network 135 may be a local area network ("LAN"), including, without limitation, a fiber network, an Ethernet network, a Token-Ring network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

In various embodiments, the printables server 140 may be configured to provide information associated with a printable model, for example, as part of a data stream to the media player 105. In further embodiments, the printables server 140 may be configured to determine whether information associated with a printable model should be provided to the media player 105 and/or printing device 130 in the first place. For example, the printables server 140 may include access control 145 logic. The access control 145 may be configured to determine whether a media player 105 and/or printing device 130 has ordered, requested, or otherwise obtained access to one or more printable models associated with streaming media content, for example, a television program (e.g., a television show, a home-shopping broadcast, commercial or infomercial, etc.), movie, or live event. For example, in some embodiments, when ordering or otherwise viewing streaming media content from the media device 105, a user may be presented with an option to purchase, obtain, or alternatively given the option to select, one or more printable models associated with, for example, a character in a movie or show, an actor, an athlete playing in a sporting event, an object (e.g., a ball, a vehicle, spaceship, etc.), or a scene in a movie.

In yet further embodiments, printable models may be available for other types of digital media, such as e-books, audiobooks, podcasts, catalogs, EPGs, among others. Information associated with a printable model may be associated with the data in the other types of digital media similarly to an audio, video, or AV stream. For example, information associated with a printable model may indicate a page or passage of an e-book in which to prompt a user whether they would like to obtain a printable model for a character in the book.

The access control 145 may include, for example, an application programming interface ("API") for accessing various resources, such as printable models (e.g., 3-D model files) from the design database 150. For example, the API may be configured to interface between the printables server 140 and one or more of the content server 155, media player 105, and/or printing device 130. For example, the access control 145 may be configured to receive inputs from the media player 105 and/or printing device 130 and facilitate communications between the media player 105 or printing device 130 and the printables server 140. The access control 145, for example, may be configured to receive information associated with a printable model (e.g., identification information, a security token, etc.) selected by a user associated with the media player 105 and/or printing device 130. For example, when a user is prompted or select to print a printable model, information associated with the printable model may be transmitted by the media player 105 and/or printing device 130 to the printables server 140 via the access control 145. The media player 105 and/or printing device 130 may further be configured to transmit, via the access control 145, one or more user customizations to the printable model, as previously described. In various embodiments, the access control 145 may be configured to determine a respective printable model to obtain, and user customizations to be made to the respective printable model. In some embodiments, the access control 145 may be configured to allow user customizations to be selected, and in some examples, applied to a printable model. For example, the access control 145 may be configured to allow the media player 105 and/or printing device 130 to modify a 3-D model file with the user customizations selected by a user.

In further embodiments, the access control 145 may be configured to authenticate a user, the media player 105, and/or the printing device 130 and authorize the user, media player 105, and/or printing device 130 to access the design database 150, and obtain a printable model (e.g., a 3-D model file) from the design database 150. Once a printable model has been obtained from the design database 150, the printables server 140 may be configured to transmit the printable model, for example, by transmitting a 3-D model file of the printable model with any applied user customizations, to the media player 105. Thus, once the media player 105 receives, for example, a 3-D model file, the media player 105 may be configured to print the printable model via the printing device 130.

Figure 2:
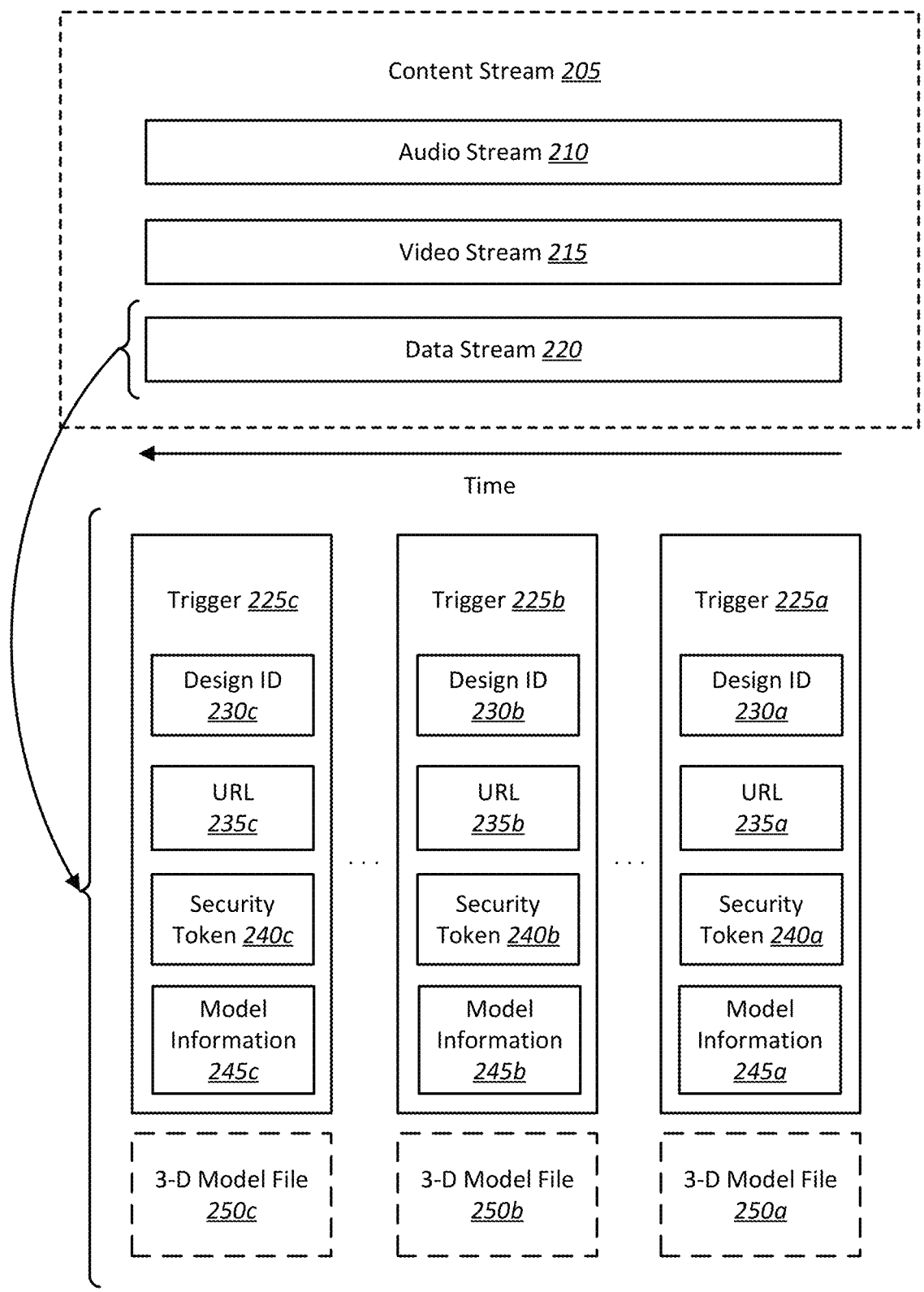
FIG. 2 is a schematic representation of a content stream for entertainment printables, in accordance with various embodiments.

FIG. 2 is a schematic representation 200 of a content stream 205, in accordance with various embodiments. The content stream 205 may include an audio stream 210, video stream 215, and a data stream 220. The data stream 220 may further include one or more triggers 225a-225c. The one or more triggers 225a-225c may further include a respective design identifier (ID) 230a-230c, URL 235a-235c, security token 240a-240c, model information 245a-245c, and 3-D model files 250a-250c. It should be noted that the various types of component streams (e.g., audio stream 210, video stream, and data stream 220), and data contained with the one or more triggers 225a-225c are schematically illustrated in FIG. 2, and that modifications to the content stream 205 and/or one or more triggers 225a-225c may be possible in accordance with various embodiments.

As previously described, the content stream 205 may include different types of component streams, such as an audio stream 210, video stream 215, and data stream 220. In some embodiments, the content stream 205 may be produced by a content server, printables server, or by a media player receiving each of the component streams. For example, a content server may provide one or more of the audio stream 210, video stream 215, or data stream 220 to a media player, while a printables server may provide one or more triggers 225a-225c, or one or more of the component streams, such as the data stream 220, to the media player. The media player may then combine the component streams into the content stream 205 to be played on a display device, such as a television.

In further embodiments, the printables server may be configured to transmit the one or more triggers 225a-225c, and in some examples, one or more 3-D model files 250a-250c to a content server to be combined with or added to the content stream 205. For example, the content server may be configured to combine the one or more triggers 225a-225c and one or more 3-D model files 250a-250c with the data stream 220. Alternatively, a content server may be configured to provide one or more of the audio stream 210, video stream 215, or data stream 220 to the printables server. The printables server may then add the one or more triggers 225a-225c to the data stream 220, to produce content stream 205. In some embodiments, the printables server may further be configured to transmit one or more 3-D model files 250a-250c with the data stream 220. In some embodiments, the printables server may add the one or more 3-D model files 250a-250c to the data stream 220 in associated with the one or more triggers 225a-225c, or otherwise associated with the audio stream 210, video stream 215, or both the audio and video streams 210, 215.

In various embodiments, the audio stream 210 may include audio data for associated media content, such as a television program or broadcast (e.g., a television show, a home-shopping broadcast, commercial or infomercial, etc.), movie, live event, webcast, podcast, audio book, or other media content. Similarly, video stream 215 may include video data for associated media content as previously described with respect to the audio stream 210. The audio stream 210 and video stream 215 may be synchronized, such that audio and video data may be played on a display device, such as a television.

In various embodiments, the content stream 205 may further include a data stream 220 associated with the media content. As previously described, the data stream 220 may include CC data, EPG data, and other data associated with the media content. For example, other data may further include, without limitation, actor information, a plot synopsis, or event information (e.g., live scores or breaking news updates), and other metadata about the selected media content. The data in the data stream 220 may further be synchronized with the audio stream 210 and/or video stream 215. Accordingly, the one or more triggers 225a-225c may be added to the data stream 220, and may also be synchronized with the audio stream 210 and/or video stream 215. For example, in some embodiments, the one or more triggers 225a-225c may include timestamp information indicating a time within the content stream associated with a respective trigger of the one or more triggers 225a-225c. In further embodiments, the one or more triggers 225a-225c may include data indicative of a printable model associated with the media content. The printables server and/or media player may be configured to determine an object or character in the audio stream 210 or video stream 215 associated with the printable model and associated a respective trigger of the one or more triggers 225a-225c with the object or character. For example, each time a character or object associated with the respective trigger of the one or more triggers 225a-225c appears in the audio stream 210 or data stream 215, the printables server and/or media player may be configured to obtain, prompt, or otherwise present the option to obtain a printable model associated with the respective trigger. For example, as previously described, a printable model associated with the one or more triggers 225a-225c may be identified in a video stream 215, for example, visually in a decoded video signal of the video stream. Alternatively, the one or more triggers 225a-225c may include video data to be displayed concurrently with or combined with the video stream 215, identifying a respective printable model within the video stream. Identification of printable models may similarly be associated with the audio stream 210, for example, by voice, name, or a timestamp within the audio stream 210. In some embodiments, the one or more triggers 225a-225c may be configured to cause a media player to obtain a printable model automatically at an associated timestamp, or on-demand by a user associated with the media player.

In various embodiments, each respective trigger of the one or more triggers may include, without limitation, a design ID 230a-230c, a URL 235a-235c, and security token 240a-240c. The design ID 230a-230c may include an identifier respectively associated with one or more printable models. For example, in some embodiments, the design ID 230a-230c may indicate a unique identifier (as will be described in greater detail below with respect to FIGS. 4A-4C) for a respective 3-D model file associated with the printable model. Each respective URL 235a-235c may include a web or network address of a respective design database. For example, in some embodiments, each of the one or more triggers 225a-225c may be associated with a respective printable model, each of which may be provided by a different seller, provider, vendor, distributor, publisher, manufacturer, or third-party provider. Thus, each respective URL 235a-235c may specify a respective web address and/or network address from which the respective printable model may be stored and/or obtained by a media player.

In various embodiments, the one or more triggers 225a-225c may further include one or more respective security tokens 240a-240c. In some embodiments, the one or more security tokens 240a-240c may be configured to allow the media player to authenticate and authorize the one or more triggers 225a-225c themselves for use by the media player. For example, a media player may be configured to authenticate a seller, vendor, or distributor via the one or more security tokens 240a-240c. The security tokens 240a-240c may further be used by the media player to ensure the printable models associated with the respective trigger 225a-225c has been authorized for distribution, sale, or otherwise to be obtained by a media player. Thus, the one or more triggers 225a-225c may, through the security tokens 240a-240c, be configured to prevent unauthorized printable models from being obtained by the media player, and in some examples, to prevent unauthorized purchases of printable models by the media player. In further embodiments, the one or more triggers 225a-225c may further be configured to implemented various DRM control schemes on various printable models. For example, in some embodiments, the one or more security tokens 240a-240c may further be used to place restrictions on certain printable models. For example, the security tokens 240a-240c may further include restrictions on certain printable models. For example, restrictions may include, without limitation, age restrictions on a purchaser, geographic restrictions (e.g., state, country, geographic area, time zone, etc.) on what printable models may be obtained in which geographic areas (e.g., a geographic location of a media player or user of the media player), etc.

In further embodiments, security token 240a-240c may include authentication and authorization information associated with a user of the media player. The security token may authenticate the media player and/or user, and authorize the media player and/or user to obtain the printable model from, for example, a printables server. For example, security token 240a-240c may be provided to the media player indicative of order or payment information. Then, when a user confirms they would like to obtain a printable model, a security token may be transmitted with a user selection to a printables server. In some embodiments, the printables server may then obtain an associated 3-D model file 250a-250c and transmit the 3-D model file 250a-250c back to the media player to print the printable model.

In some further embodiments, the one or more triggers 225a-225c may further include model information 245a-245c. The model information 245a-245c may include information about a printable model associated with a respective trigger of the one or more triggers 225a-225c. For example, model information 245a-245c may include, without limitation, information regarding the physical dimensions of the printable model, available sizes, pricing information, a name or title of the printable model, an image or video of the printable model (e.g., a photograph of the printed product, a video demonstrating the use of the printable model, or a link to a uniform resource locator (URL) or web address for an image or video), or other information about the printable model (for example, a text narrative or backstory associated with the printable model, descriptive text associated with the printable model, or marketing material associated with the printable model).

In yet further embodiments, the one or more triggers 225a-225c may include information to route a 3-D model file 250a-250c to a specific printing device directly (without using a mobile device) to authorize and initiate printing, for example, via media player 105, so that the printable model is printed at the specified printing device. For example, the specified printing device may be a local printer or a remotely located printer, such as a printer at a distribution location where the customer would pick up the printable model. In further examples, the trigger 225a-225c could contain further trigger information about the customer's preferences regarding a shipping address that the distribution site where the printable model is printed can ship the printable model once it has been printed. Thus, in various some embodiments, the trigger information may include address information for a user or customer. In yet further embodiments, the trigger 225a-225c may include address information for specifically targeted customers. In some embodiments, the media player may be configured to retrieve shipping information for the customer from, for example, a profile database based, at least in part, on the trigger information.

In some further embodiments, the data stream 220 may further include one or more 3-D model files 250a-250c. For example, in some embodiments, the media player may be configured to receive the data stream 220 including the one or more 3-D model files 250a-250c. The media player may be configured to extract or otherwise obtain the 3-D model files 250a-250c from the data stream 220 itself. In some embodiments, the media player may be configured to store the 3-D model files in a local file system and/or storage device. In other embodiments, the media player 105 may further transmit the 3-D model file to a remote storage device accessible, for example, via a network connection. Each of the 3-D model files 250a-250c may further be associated with a respective trigger of the one or more triggers 225a-225c. For example, a first 3-D model file 250a may be associated with the first trigger 225a. Thus, in one example, the media player may be configured to determine, upon the occurrence of the first trigger 225a, to obtain and print a printable model associated with the first 3-D model file 250a. In some embodiments, the 3-D model files 250a-

250c may further be associated with the audio stream 210, video stream 215, or both audio and video streams 210, 215. For example, a respective 3-D model file 250a-250c may be associated with a timestamp of the video stream 215. Thus, in some examples, the 3-D model file 250a-250c may be transmitted to and/or obtained by a media player upon reaching an associated timestamp of the video stream 215. In further embodiments, the 3-D model files 250a-250c may be extracted from the data stream 220 and stored locally and/or remotely. Upon the occurrence of an associated trigger 225a-225c, or upon reaching a timestamp of the audio stream 210, video stream 215, or both, the media player may be configured to retrieve the appropriate 3-D model file 250a-250c from local and/or remote storage device. Once retrieved, the appropriate model file 250a-250c may be transmitted to a printing device, as previously described.

Figure 3:
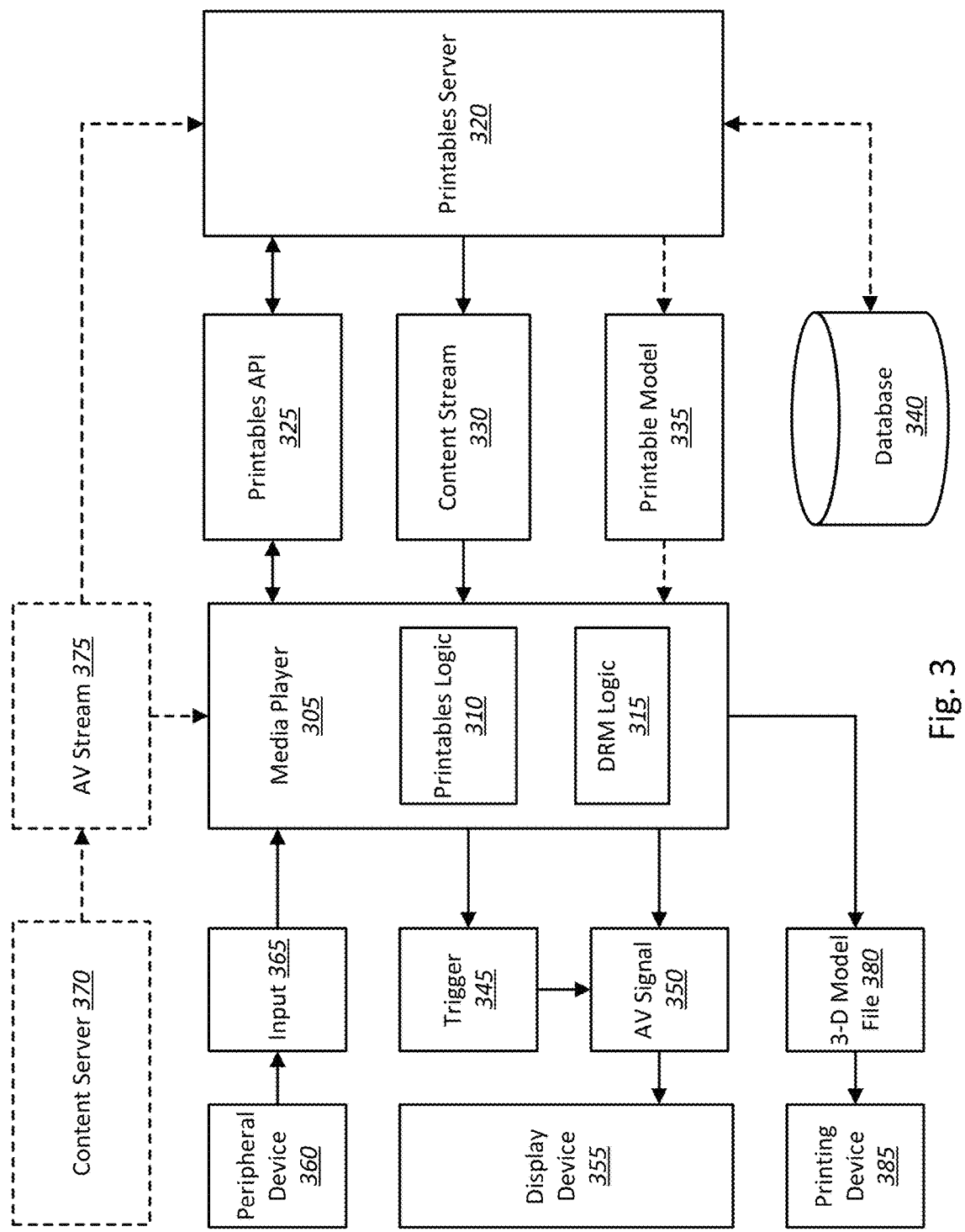
FIG. 3 is a functional block diagram of a system for entertainment device communication with printing devices, in accordance with various embodiments.

FIG. 3 is a functional block diagram of a system 300 for entertainment printables, in accordance with various embodiments. The system 300 includes a media player 305, printables logic 310, DRM logic 315, printables server 320, printables API 325, content stream 330, printable model 335, database 340, trigger 345, AV signal 350, display device 355, peripheral device 360, input 365, content server 370, AV stream 375, 3-D model file 380, and printing device 385. It should be noted that the various components and functions of the system 300 are schematically illustrated in FIG. 3, and that modifications to the architecture, signals, inputs, outputs, and functions of the system 300 may be possible in accordance with various embodiments.

In various embodiments, media player 305 may include printables logic 310 and DRM logic 315. The media player 305 may be coupled to the printables server 320 via a printables API 325. The printables server 320 may be configured to provide a content stream 330 and a printable model 335 to the media player 305. The printables server 320 may further be coupled to a database 340. Optionally, the printables server 320 may be configured to receive an AV stream 375 from a content server 370. In various embodiments, the media player 305 may be coupled to a display device 355, and configured to output an AV signal 350, and in some examples, a trigger 345, to the display device 355. The media player 305 may further be coupled to a peripheral device 360. The media player 305 may be configured to receive an input 365, from the peripheral device 360. Optionally, the media player 305 may further be configured to receive an AV stream 375 from the content server 370. The media player 305 may also be coupled to a printing device 385. The media player 305 may be configured to transmit a 3-D model file 380 to the printing device 385 to print the printable model 335.

As previously described with respect to FIGS. 1 & 2, the media player 305 may be configured to receive a content stream 330, which may include an AV stream and a data stream. The AV stream may include one or more of an audio stream or video stream, which includes audio or video data associated with respective media content, as previously described. Similarly, the data stream may include CC data, EPG data, metadata, and other data associated with the media content. The data stream may further include one or more triggers, including the trigger 345. Once received by the media player 305, the printables logic 310 may be configured to obtain the one or more triggers from the content stream 330 for further processing. In some embodiments, the media player 305 and/or the printables logic 310, may be configured to determine a timestamp associated with the one or more triggers to determine when to perform an action responsive to the trigger, such as trigger 345. For example, in some embodiments, the media player 305 may obtain a printable model 335 from the printables server at the timestamp associated with the trigger 345.

In other embodiments, the media player 305 may be configured to combine information contained within the trigger 345 with an AV signal 350 output to the display device. For example, in various embodiments, the media player 305 may be configured to output an AV signal 350, based on the AV stream (such as AV stream 375), which may be used by the display device 355 to play the media content. In various embodiments, the AV signal 350 may include analog audio and/or video signals playable by the display device 355. The trigger 345 may further include audio and/or video data, associated with a printable model, such as an object or character in the media content. Thus, in some embodiments, the trigger 345 may further include audio and/or video data, which may be decoded into an audio and/or video signal that may be combined with the AV signal 350, and playable by the display device 355. For example, as previously described, the trigger 345 may include further AV data, such as pixel or frame information, associated with a character or object being displayed on the display device 355. In some embodiments, the printables server 320 may be configured to generate and transmit the content stream 330 to the media player 305. In an alternatively embodiments, the AV stream 375 may be provided to the media player 305 separately from the one or more triggers from the printables server 320.

Accordingly, the trigger 345 may be used to identify, for example with an overlay, a printable model being displayed by display device 355. In other embodiments, the media player 305, via the printables logic 310, may be configured to identify a printable model within the AV stream based on the trigger 345. For example, in some embodiments, the media player 305, via the printables logic 310, may be configured to identify printable models visually, through image analysis or photogrammetrically. In yet further embodiments, the media device 305, via the printables logic 310, may be configured to dynamically generate a 3-D model file or alternatively, obtain a dynamically generated 3-D model file from the printables server 320.

In further embodiments, the trigger 345 may be configured to cause the media player to prompt the user regarding whether the user would like to print or obtain a printable model, for example, when the timestamp has been reached. In some embodiments, the prompt may include, without limitation, text, a button, popup, window, or other object which may be displayed on the display device 355 to inform the user to take an action to cause a printable model to be printed or obtained.

In various embodiments, trigger 345 may further include, without limitation, a design ID, a URL, and security token. As previously described, the design ID may include an identifier respectively associated with one or more printable models or a 3-D model file associated with the printable model within a design database, such as database 340. The URL may include a web or network address of a respective design database, such as the database 340. In various embodiments, the trigger 345 may further include a security token. In some embodiments, the security token may be configured to allow the media player 305, via the DRM logic 315, to authenticate and authorize the trigger 345 and associate printable model. In further embodiments, the security token may be configured to allow the media player 305 to ensure the printable models associated with the trigger 345 has been authorized for distribution, sale, or otherwise to be obtained by a media player 305. In further embodiments, the trigger 345 may further be configured to implement various DRM control schemes, via the DRM logic 315, on various printable models. For example, the trigger may indicate restrictions on certain printable models, including, without limitation, age restrictions on a purchaser, geographic restrictions (e.g., state, country, geographic area, time zone, etc.) on what printable models may be obtained in which geographic areas (e.g., a geographic location of a media player or user of the media player), etc. Thus, in some embodiments, the media player 305 may be configured to determine a physical/geographic location, a network location, or other information needed to verify, via the DRM logic 315, that restrictions on the printable model have been met. Thus, in various embodiments, the media player 305 may include sensors, such as a microphone, camera, photodetector, global navigation satellite system (GNSS) receiver, accelerometer, gyroscope, moisture reader, thermometer, rangefinder, and motion detector, among other types of sensors to determine whether restrictions on the printable model are met. Thus, in various embodiments, the DRM logic 315 may be configured to determine, without limitation, whether a user, media device 305, content stream 330, trigger 345, or printable model 335 are authenticated and authorized.

In further embodiments, the trigger 345 may further include a security token to authenticate the media player and/or user, and authorize the media player and/or user to obtain the printable model from, for example, the printables server 320. For example, security token may be provided to the media player indicative of order or payment information. When a user confirms they would like to obtain printable, the security token may be transmitted with a user selection to a printables server to obtain the printable model 335.

In some embodiments, a user may select a character and/or object to print via a peripheral device 360. In yet further embodiments, the timestamp may further indicate when the media player 305 should make characters and/or objects selectable. Accordingly, the media player 305 may be configured to modify the AV signal 350 based on the trigger 345 to include information about at least one printable model relative to the AV stream 350. In some embodiments, a user may provide an input 365 via the peripheral device 360 to indicate whether to obtain and print a printable model, to provide selections of user customizations of the printable model, to provide authentication and/or authorization information (e.g., login information, payment information, etc.), and other inputs 365 that may be required to provide a response based on the trigger. User customizations may include, without limitation, colors, size, poses or positions of a character, types of clothing and accessories, facial expressions, text or other alphanumeric characters to be printed with the printable model, or other features affecting the appearance of a printable model.

Thus, the peripheral device 360 may include, without limitation, a remote control, keyboard, mouse, microphone, camera, or other attached device. In yet further embodiments, the user input 365 may be provided directly via the display device 335. For example, the display device 335 may include a touchscreen display through which the user may interact with and provide inputs 365 to the media player 305. The media player 305 may be configured to receive the input 365 and determine whether and how to obtain a printable model. For example, in some embodiments, the input 365 may include user customization information, purchase or order information, and the like provided by a user via the peripheral device 360. The user input 365 may be combined with information contained in the trigger 345 such as a design ID and security token, and transmitted, via the printables API 325, to a printable server 320 to obtain an associated printable model.

Accordingly, in various embodiments, the printables server 320 may be configured to obtain a printable model (e.g., a 3-D model file), based on the user input 365 and trigger information, received from the media player 305, via the printables API 325. For example, in some embodiments, the printables server 320 may determine a printable model 335 to obtain from the database 340. Once obtained by the printables server 320, the printables server 320 may be configured to transmit the printable model 335 by, for example, transmitting a 3-D model file 380 as indicated by the trigger information to the media player 305.

In a further set of embodiments, the printables server 320 may be configured to transmit a 3-D model file 380 to the media player 305 concurrently with the content stream 330. In some embodiments, the 3-D model file 380 may be included within the content stream 330. The media player 305 may, in some embodiments, be configured to extract the 3-D model file 380 from the content stream 330 and store the 3-D model file 380 in a local and/or remote file system. Accordingly, the printables logic 310 of the media player 305 may further include instructions executable by the media player 305 to obtain a 3-D model file 380 from the content stream 330, and to store the 3-D model file 380. Upon occurrence of a trigger 345, as previously described, the media player 305 may be configured to obtain the 3-D model file 380 from local and/or remote storage. In other embodiments, upon the occurrence of a trigger 345, the 3-D model file 380 may be obtained from a data stream of the content stream 330.

In various embodiments, once the 3-D model file 380 has been obtained, for example, from the database 340 via the printables server 320, or alternatively, from local and/or remote storage or otherwise from the content stream 330, the media player 305 may be configured to transmit the 3-D model file 380 to a printing device 385. As previously described, printing device 385 may include various types of 3-D printers, CNC machines, SLS machines, inkjet printers, among other printing and additive manufacturing devices. The media player 305 may be coupled to the printing device 385 via a wired or wireless connection. In various embodiments, 3-D model files may include, without limitation, STL, 3MF, or other printable file formats.

Figure 4C:
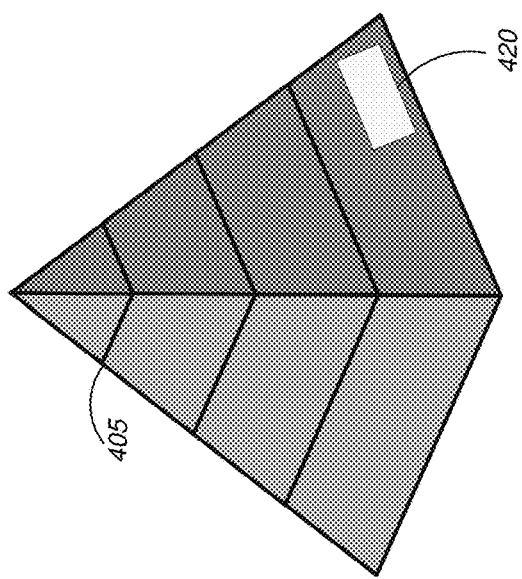
FIG. 4A-4C are block diagrams illustrating exemplary signatures and entitlements for printable models, in accordance with various embodiments.
Figure 4B:
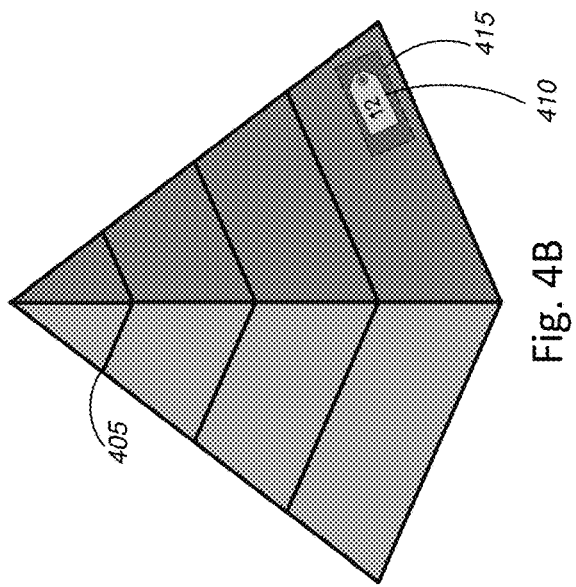
Figure 4A:
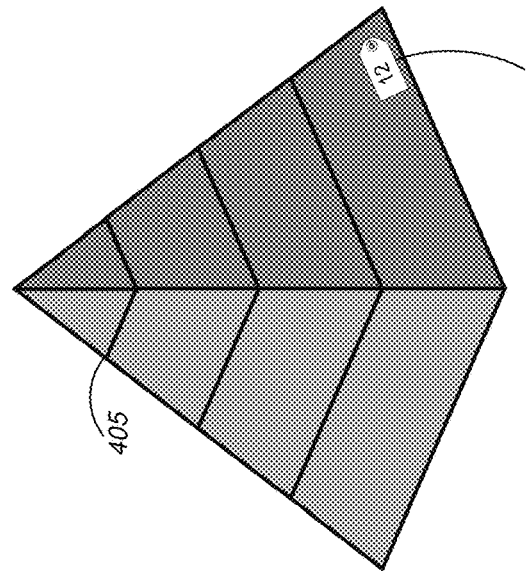

FIGS. 4A-4C (collectively, FIG. 4) are block diagrams illustrating exemplary signatures and entitlements for printable models, in accordance with various embodiments. FIG. 4 includes a printable model 405, which may include a 3-D printable model. The printable model 405 may be printed by a 3-D printer, CNC machine, SLS machine, inject printer, or other printing or additive manufacturing device (which may correspond to printing device 130 of FIGS. 1A & 1B).

A unique identifier 410 may be embedded and/or etched on the printable model 405. A printing device may embed the unique identifier 410 into the printable model 405. Additionally and/or alternatively, a laser may be used to etch or embed the unique identifier into the printable model 405. The unique identifier 410 may include a serial number, a barcode, a QR code, a microdot, an alphanumeric string, a signature, a pattern, a 3-D pattern, a textured pattern, or a watermark.

The unique identifier 410 may be a different color or material from the printable model 405. Alternatively, the unique identifier 410 may be a unique pattern that is incorporated into the design of the printable model 405.

The unique identifier 410 may indicate that a user was authorized to print the printable model 405. The unique identifier 410 may identify an original creator of the printable model 405, the printable model 405 itself, a limited edition of the printable model 405, or an owner of the printable model 405. By embedding and/or etching a unique identifier 410 into the printable model 405, an owner, proprietor, licensee, or other party with control over the design may easily determine whether a user was authorized to print the printable model 405 or whether a user is infringing the design. The unique identifier 410 may also be used to protect against theft of the printable model 405 and identify the original owner of the printable model 405.

The unique identifier 410 may be embedded on a surface of the printable model 405 by the printing device and/or etched into the printable model 405 by a laser, as shown in FIG. 4A. Additionally and/or alternatively, the unique identifier 410 may be embedded in or etched into a sub-surface of the printable model, as shown in FIGS. 4B and 4C.

When the unique identifier 410 is embedded or etched in a sub-surface of the printable model 405, the unique identifier 410 may be covered by a transparent layer 415, as shown in FIG. 4B. Alternatively, when the unique identifier 410 is embedded in a sub-surface of the printable model 405, the unique identifier 410 may be covered by an opaque layer 420, shown in FIG. 4C. This may be done in order to protect the identifier from being easily removed and/or copied by potential infringers.

In some embodiments, when the unique identifier 410 is covered by a transparent layer 415, an owner, proprietor, licensee, or other party with control over the design may easily determine whether a user was authorized to print the printable model 405 or whether a user is infringing the design. Alternatively, when the unique identifier 410 is covered by an opaque layer 420, a user of the printable model 405 and potential infringers of the printable model design may not know the unique identifier 410 exists. Thus, it may be harder for potential infringers and/or pirates of the design to copy the unique identifier 410. Accordingly, When the unique identifier 410 is covered by a transparent layer 415 and/or opaque layer 420, the unique identifier 410 may be viewed by removing the transparent layer 415 and/or opaque layer 420. The unique identifier 410 may also be printed using a different color or a different material that can be distinguished using different techniques. For example, X-rays and other imaging techniques may be used to detect the unique identifier 410 embedded or etched below the surface of the printable model 405. Additionally and/or alternatively, the sub-surface identifier 410 may also be made from an electrically conductive material that can be detected via radio frequency waves. The unique identifier 410 may also be an electronic identifier that can be accessed via wireless radio technology or via electrical contacts. Some electronic identifiers may have one or more processors and/or non-transitory computer readable mediums configured to transmit the unique identifier 410.

Figure 5:
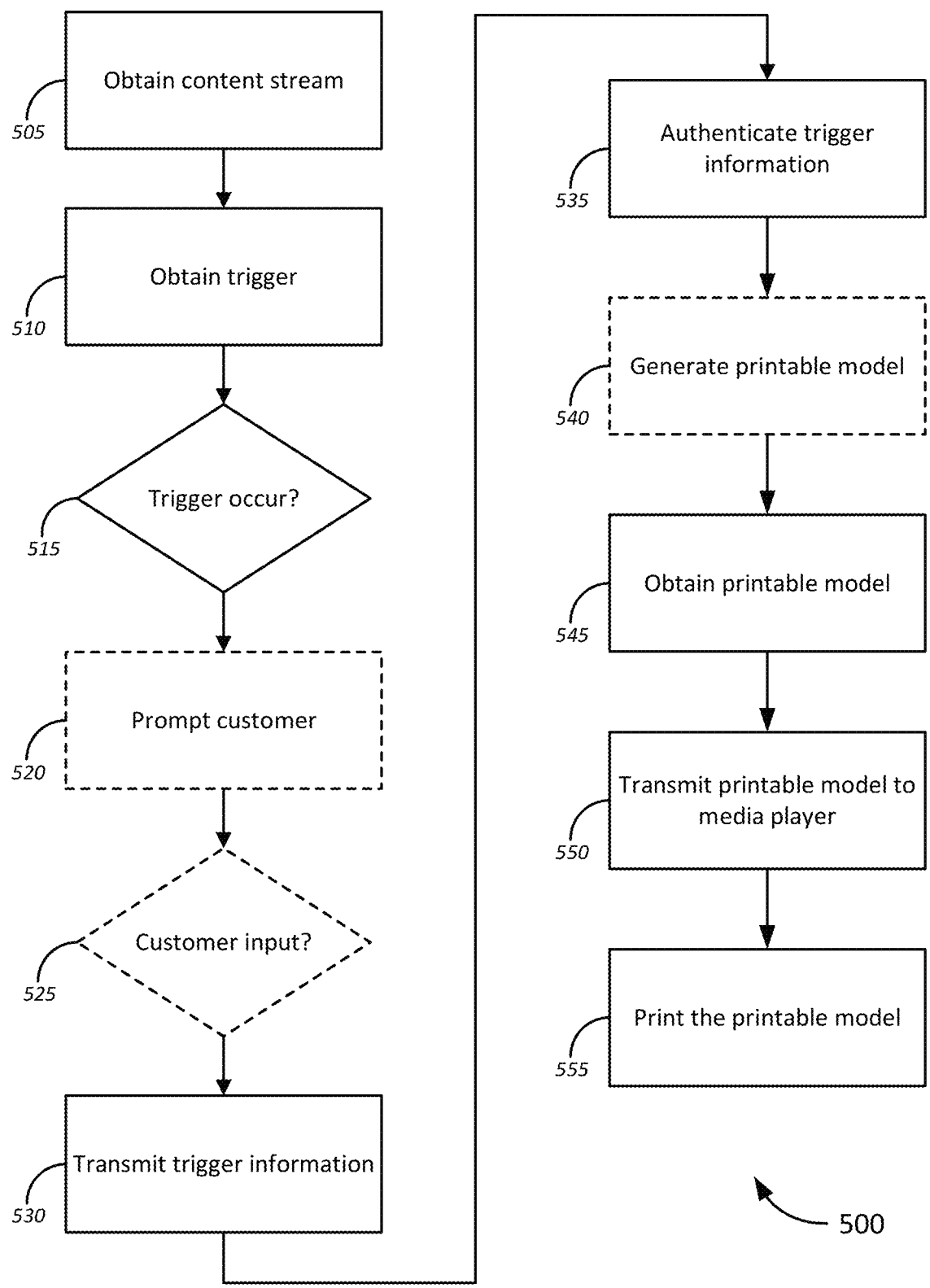
FIG. 5 is a flow diagram of a method for communication between an entertainment device and printing devices, in accordance with various embodiments.

FIG. 5 is a flow diagram of a method 500 for entertainment printables, in accordance with various embodiments. The method 500 begins, at block 505, by obtaining a content stream. As previously described, a media player may be configured to obtain a content stream, including an audio, video, or AV stream, and a data stream including one or more triggers. In some embodiments, the media player may be configured to receive the content stream from a printables server. The printables server may, therefore, be configured to generate the content stream from one or more of an audio, video, or AV stream, and a data stream including the one or more triggers. Alternatively, the media player may be configured to receive the content stream from a content server, which may be configured to receive a data stream including the one or more triggers from a printables server.

At block 510, the method 500 may continue by obtaining a trigger from the content stream. In various embodiments, the media player may be configured to obtain the trigger from the content stream. For example, as previously described, the trigger may be obtained from a data stream including one or more triggers. In various embodiments, the media player may be configured to perform an action responsive to the trigger. Accordingly, at decision block 515, the method 500 may continue by determining whether the trigger (e.g., an event associated with the trigger) has occurred. For example, in some embodiments, the trigger may include or otherwise be associated with a timestamp of the content stream. Accordingly, when the timestamp is reached in the content stream, the trigger may be configured to cause the media player to perform an action, as previously described. In some embodiments, the trigger may be associated with a character or object in the content stream. Accordingly, the media player may be configured to identify that a character or object associated with the trigger is being displayed in the content stream.

At optional block 520, in response to determining that the trigger has occurred, the method 500 may continue by prompting a customer. For example, in various embodiments, the customer (e.g., a user) may be prompted, via the media device, as to whether the customer wishes to obtain and/or print a printable model. As previously described, prompting may include making a character or object selectable, or presenting the user with text, a button, popup, window, or other object which may inform the user to provide a response to cause a printable model to be obtained and/or printed.

At optional decision block 525, a customer's input (e.g., user input) responsive to the prompt may be determined. In various embodiments, a user input may be received by the media player. The user input may be configured to indicate whether a printable model should or should not be obtained. In some embodiments, a user may be presented with the option to customize a printable model. Thus, the user input may be configured to indicate a selection of user customizations of a printable model. In further embodiments, the user input may further include trigger information. As previously described, the trigger information may include information to identify a printable model, a network or web address from which to obtain the printable model, authentication and authorization information, among other information.

At block 530, the method 500 may continue by transmitting the trigger information to a printables server. In various embodiments, the trigger information may include, without limitation, a design ID identifying a respective printable model, a URL indicative of a network or web address of a server or database from which to obtain the printable model, and a security token for authentication and authorization, as previously described. Accordingly, in some embodiments, the trigger information may be transmitted, by the media player, to a printables server, as part of a request for a printable model. Thus, the trigger information may indicate where to transmit the request, a printable model to obtain, and information to authenticate and authorize the printable model to be obtained. In yet further embodiments, the trigger information may include or be combined with information provided in the user input, such as customization information, and transmitted to the printables server.

At block 535, the trigger information may be authenticated by the printables server. For example, the printables server may include an API configured to provide access control to various printable models. As previously described, the printables server may be configured to authenticate and authorize a media player to obtain a printable model based, at least in part, on the trigger information. In some embodiments, authentication of the trigger information may include using a security token to authenticate a media player or user associated with the media player, and authorize the media player or user associated with the media player to obtain a printable model. As part of access control, the printables server may further verify any DRM restrictions placed on the media player, user, or printable model itself.

At optional block 540, the printable model may be generated dynamically based on a user input and trigger information. For example, images or frames from an AV stream, and any user customizations, may be provided to a printables server. The printables server may be configured to dynamically generate a 3-D model file based on the images or frames of the AV stream selected by a user, and any user customizations provided by the user.

At block 545, the printable model may be obtained from a design database. For example, in the printables model may be configured to obtain a 3-D model file associated with the printable model. The 3-D model file may, in some examples, be obtained based on trigger information (e.g., design ID). In further embodiments, the printables server may be configured to modify the 3-D model file based on user customizations by modifying various attributes of the 3-D model file. For example, in some embodiments, the 3-D model file may include 3-D design files as known to those in the art. Various types of 3-D design files include various attributes which may be changed, including textures, colors, size, and orientation. Thus, the printables server may be configured to modify the 3-D model file based on user customizations.

At block 550, the printable model may be transmitted to the media player. In various embodiments, the media player may be configured to read the 3-D model file and send instructions to a 3-D printer or other printing device to print an object based on the 3-D model file. In some embodiments, the media player may be configured to transmit the 3-D model file to the printing device. In some embodiments, the media player may further be configured to modify the 3-D model file based on user customizations, as described above. In further embodiments, the media player may be configured to verify that the 3-D model file is correct, and further, to determine whether DRM restrictions are met, and whether the media player is authorized to print the printable model. At block 555, the printable model may be printed via a 3-D printer in communication with the media player.

Figure 6:
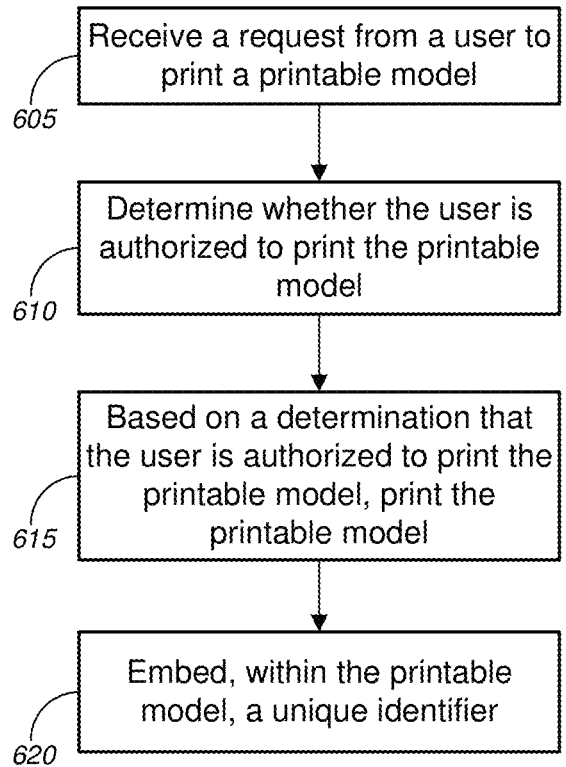
FIG. 6 is a flow diagram of a method for exemplary signatures and entitlements for entertainment printables, in accordance with various embodiments.

FIG. 6 is a flow diagram of a method 600 for exemplary signatures and entitlements for printable models, in accordance with various embodiments. The method 600 begins, at block 605, by receiving, at a three-dimensional ("3-D") printer, a request from a user to print a printable model. The printable model may be a 3-D printable model. The request from the user may be received directly at the 3-D printer, CNC machine, SLS machine, or other printing device, through a media player, and/or via input through a peripheral device such as a remote control, keyboard, mouse, microphone, camera, a computer, a tablet computer, a mobile phone, or other attached device. Additionally and/or alternatively, the request may be received, by the 3-D printer, automatically from the media player without user input. For example, when a timestamp associated with the streaming audio, video, or AV content is reached at the media player, the media player may direct the 3-D printer to print a 3-D object associated with the streaming audio, video, or AV content.

At block 610, the method 600 may continue by determining, with the 3-D printer, whether the user is authorized to print the printable model. The 3-D printer may be configured to verify that the printable model file is correct, to determine whether DRM restrictions are met, and to determine whether the 3-D printer is authorized to print the printable model. In order to determine whether the user is authorized to print the printable model, the 3-D printer may determine whether a user has purchased the printable model and/or whether a user has purchased content associated with the printable model. For example, if a user has purchased content (e.g., a movie, TV show, book, etc.), an authorization to print a printable model may be included with the purchased content.

The 3-D printer may receive a security token indicating that the user has purchased the right to print the printable model. The security token transmitted to the printer may only authorize a user and/or the printer to print the printable model for a limited period of time. In other words, the security token may expire after a predetermined amount of time (e.g., after 5 minutes, after 30 minutes, after an hour, after a day, after a week, after the media content has ended, 5 minutes after the media content has ended, a day after the media content has ended, etc.). If the user and/or the printing device do not print the model within the predetermined period of time, the user and/or printer device 130 may have to re-transmit a new security token, re-order the 3-D model file, and/or re-request the authorization to print the 3-D model. The security token may then be used by the 3-D printer to decrypt a file containing the printable model and/or one or more unique identifiers contained within the printable model file. Additionally and/or alternatively, the security token may be used to determine whether the file containing the printable model file has been tampered with in an attempt to by-pass DRM. For example, different security tokens may be compared to determine whether a user has attempted to by-pass DRM.

The method 600, at block 615, might further include printing, with the 3-D printer, the printable model based on a determination that the user is authorized to print the printable model. At block 610, the method 600 may continue by embedding, with the 3-D printer, within the printable model, a unique identifier. The unique identifier may include a serial number, a barcode, a QR code, a microdot, an alphanumeric string, a signature, a pattern, a 3-D pattern, a textured pattern, or a watermark.

The unique identifier may be a different color or material from the printable model. Alternatively, the unique identifier may be a unique pattern that is incorporated into the design of the printable model.

The unique identifier may indicate that a user was authorized to print the printable model. The unique identifier may identify an original creator of the printable model, the printable model itself, a limited edition of the printable model, or an owner of the printable model. By embedding and/or etching a unique identifier into the printable model, the owners of a design may easily determine whether a user was authorized to print the printable model or whether a user is infringing the owner's design. The unique identifier may also be used to identify an original owner of the printable model and protect against theft of the printable model.

The unique identifier may be embedded on a surface of the printable model by the 3-D printer and/or etched into the printable model by a laser. Additionally and/or alternatively, the unique identifier may be embedded in or etched into a sub-surface of the printable model.

When the unique identifier is embedded or etched in a sub-surface of the printable model, the unique identifier may be covered by a transparent layer. Alternatively, when the unique identifier is embedded in a sub-surface of the printable model, the unique identifier may be covered by an opaque layer. This may be done in order to protect the identifier from being easily removed and/or copied by potential infringers.

In some embodiments, when the unique identifier is covered by a transparent layer, an owner, proprietor, licensee, or other party with control over the design may easily determine whether a user was authorized to print the printable model or whether a user is infringing a design. Alternatively, when the unique identifier is covered by an opaque layer, a user of the printable model and potential infringers of the printable model design may not know the unique identifier exists. Thus, it may be harder for potential infringers of the design to copy the unique identifier.

When the unique identifier is covered by a transparent and/or opaque layer, the unique identifier may be viewed by removing the layer. The unique identifier may also be printed using a different color or a different material that can be distinguished using different techniques. For example, X-rays and other imaging techniques may be used to detect the unique identifier embedded or etched below the surface of the printable model. Additionally and/or alternatively, the sub-surface identifier may also be made from an electrically conductive material that can be detected via radio frequency waves. The unique identifier may also be an electronic identifier that can be accessed via wireless radio technology or via electrical contacts. Some electronic identifiers may have one or more processors and/or non-transitory computer readable mediums configured to transmit the unique identifier.

Accordingly, in some embodiments, the unique identifier may be included as part of a 3-D model file, as described above. Thus, in some embodiments, the 3-D model file may include instructions for printing the printable model to include the unique identifier. In some embodiments, as previously described, the unique identifier may be embedded in the 3-D model file dynamically. For example, once a user has been authorized and/or authenticated (for example, via DRM logic within the 3-D printer and/or media player), the unique identifier may be added to the 3-D model file. Thus, in some embodiments, a printables server and/or media player may be configured to alter a 3-D model file to include the unique identifier. In yet further embodiments, the unique identifier may be dynamically generated by a printables server and/or media player upon authorization and/or authentication of a user. Once the unique identifier has been generated, it may then be added to the 3-D model file such that the printable model is produced with the unique identifier.

Figure 7:
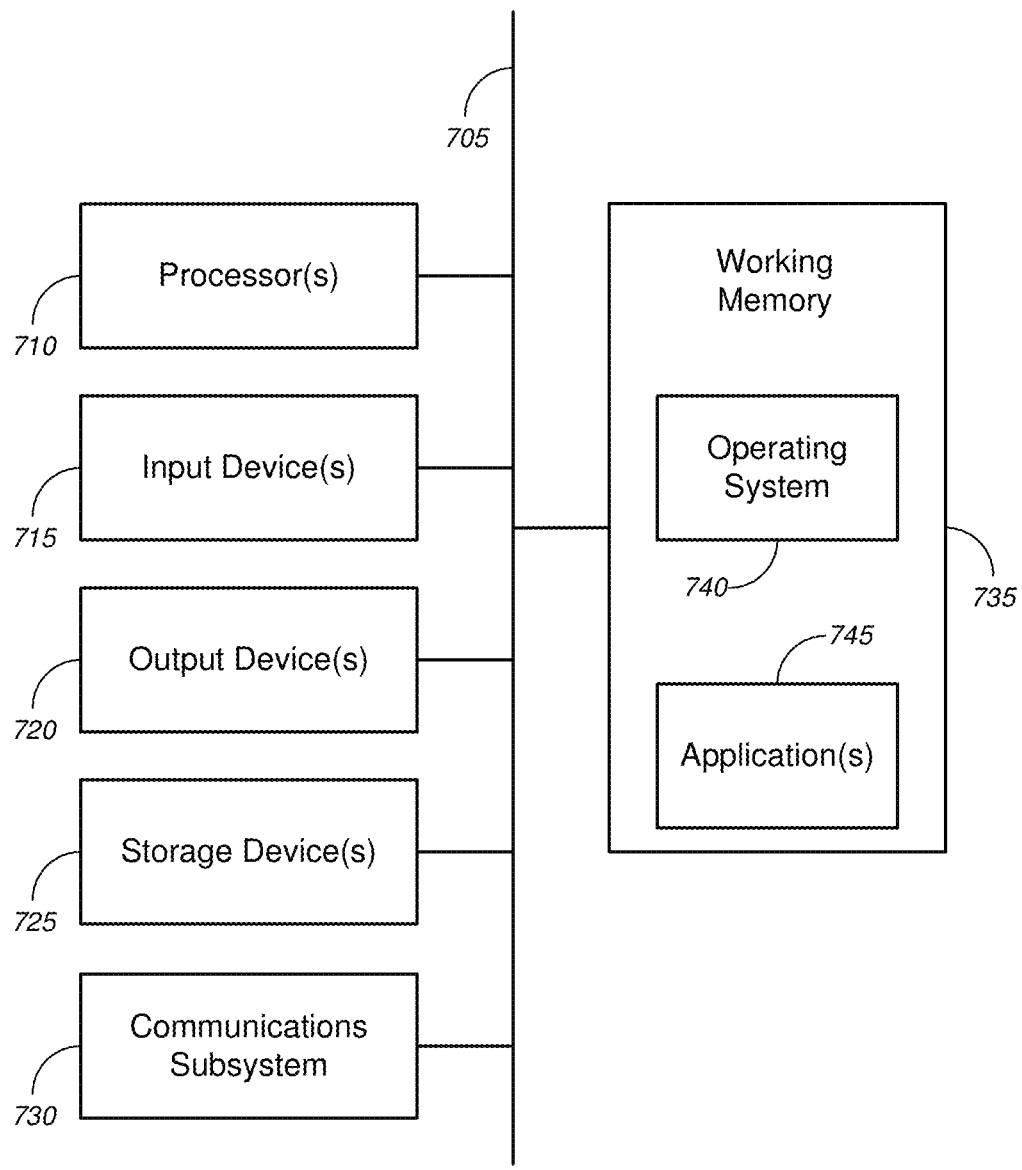
FIG. 7 is a schematic block diagram of a computer system for entertainment device communication with printing devices, in accordance with various embodiments.

FIG. 7 is a schematic block diagram of a computer system 700 for entertainment printables, in accordance with various embodiments. FIG. 7 provides a schematic illustration of one embodiment of a computer system 700, such as a media player, printables server, or content server, which may perform the methods provided by various other embodiments, as described herein. It should be noted that FIG. 7 only provides a generalized illustration of various components, of which one or more (or none) of each may be utilized as appropriate. FIG. 7, therefore, broadly illustrates how individual system elements may be implemented in a relatively separated or relatively more integrated manner.

The computer system 700 includes multiple hardware elements that may be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and microcontrollers); one or more input devices 715, which include, without limitation, a mouse, a keyboard, one or more sensors, and/or the like; and one or more output devices 720, which can include, without limitation, a display device, and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 700 might also include a communications subsystem 730, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, cellular communication facilities, etc.), and/or the like. The communications subsystem 730 may permit data to be exchanged with a network (such as the network described below, to name one example), with other computer or hardware systems, between data centers or different cloud platforms, and/or with any other devices described herein. In many embodiments, the computer system 700 further comprises a working memory 735, which can include a RAM or ROM device, as described above.

The computer system 700 also may comprise software elements, shown as being currently located within the working memory 735, including an operating system 740, device drivers, executable libraries, and/or other code, such as one or more application programs 745, which may comprise computer programs provided by various embodiments (including, without limitation, an printables logic, DRM logic, access control logic, or a printables API as described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally receives the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a storage device 725 either before or after execution by the processor(s) 710.

Figure 8:
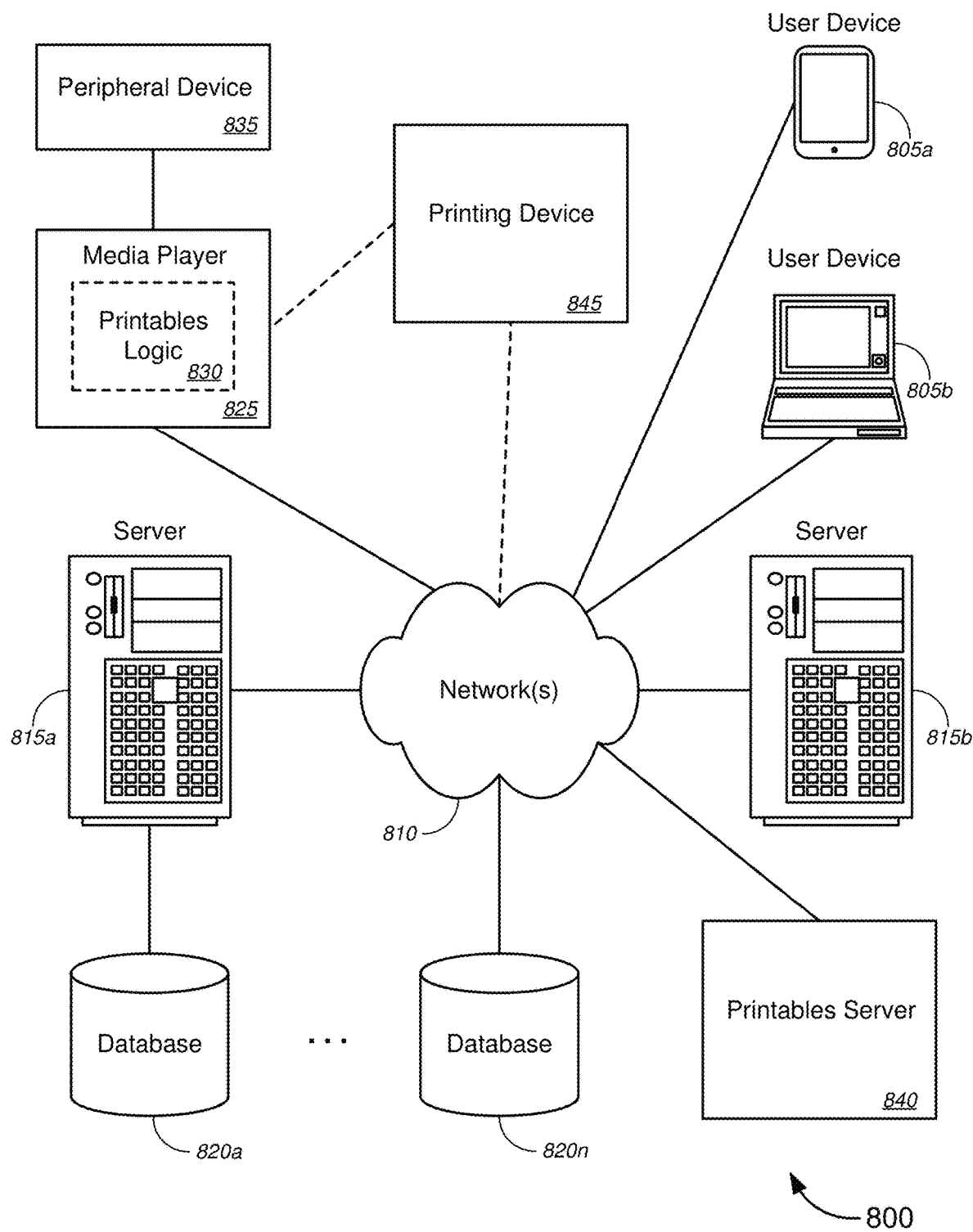
FIG. 8 is a block diagram illustrating a networked system of computing systems, which may be used in accordance with various embodiments.

FIG. 8 is a block diagram illustrating a networked system of computing systems, which may be used in accordance with various embodiments. As noted above, a set of embodiments comprises methods and systems for entertainment printables. The system 800 may include one or more user devices 805. A user device 805 may include, merely by way of example, desktop computers, single-board computers, tablet computers, laptop computers, handheld computers, and the like, running an appropriate operating system, which in various embodiments may include an AI engine and/or learning API as previously described. User devices 805 may further include cloud computing devices, IoT devices, servers, and/or workstation computers running any of a variety of operating systems. In some embodiments, the operating systems may include commercially-available UNIX™ or UNIX-like operating systems. A user device 805 may also have any of a variety of applications, including one or more applications configured to perform methods provided by various embodiments (as described above, for example, printables logic), as well as one or more office applications, database client and/or server applications, and/or web browser applications. Alternatively, a user device 805 may include any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user devices 805, any number of user devices 805 may be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™ IPX™, AppleTalk™, and the like. Merely by way of example, the network(s) 810 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications, programs (such as printables logic, DRM logic, access control logic, or a printables API as previously described), web-based services, or other network resources accessible by a client. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (or alternatively, user device 805). Alternatively, a database 820n can be remote from any or all of the computers 805, 815, 825, 835 so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815, 825, 835 can be stored locally on the respective computer and/or remotely, as appropriate.) In one set of embodiments, the database 820 may be a relational database configured to host one or more data lakes collected from various data sources, such as the managed object 825, user devices 805, or other sources. Relational databases may include, for example, an Oracle database, that is adapted to store, update, and retrieve data in response to SQL-formatted commands. The database might be controlled and/or maintained by a database server.

The system 800 may further include a media player 825, which may in turn further include printables logic 830. The media player 825 may further be coupled to a peripheral device 835, and to a printing device 845. The media player 825 may be configured to obtain one or more printable models from a printables server 840. The printables server 840 may further be configured to obtain a printable model from, for example, a design database of the one or more databases 820a-820n, and to transmit the printable model to the media player 825 via the network 810. In some embodiments, the media player 825 may be configured to transmit the printable model (e.g., a 3-D model file) to the printing device 845 to print the printable model.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
  a printer;
  a media player coupled via a direct connection to the printer, the media player comprising:
    a processor;
    a non-transitory computer readable medium comprising instructions executable by the processor to:
      obtain a content stream including at least one of an audio stream or a video stream, the content stream further including a data stream including a trigger associated with a printable model;
      obtain a 3-D model file associated with the printable model responsive to an occurrence of the trigger, wherein the trigger further comprises a design identifier and a security token, the design identifier uniquely identifying the 3-D model file, wherein the 3-D model file is obtained based on the design identifier, the security token authenticating the media player and authorizing the media player to print the 3-D model file;
      transmit printing instructions to print the 3-D model file to the printer;
      transmit the security token to the printer;
      transmit the 3-D model file to the printer; and
      print, via the printer, the printable model based on the 3-D model file;
  wherein the printer is configured to receive the printing instructions from the media player via the direct connection to the media player, wherein the direct connection is at least one of a wired or wireless connection, wherein the printer is configured to obtain, via the direct connection, the 3-D model file from the media player responsive to receiving the printing instructions.

2. The system of claim 1, wherein the instructions are further executable by the processor to:
  store the 3-D model file in a storage device;
  obtain, via the storage device, the 3-D model file responsive to a determination that an event associated with the trigger has occurred.

3. The system of claim 1, wherein the instructions are further executable by the processor to:
  obtain the 3-D model file responsive to a user input indicative of whether to obtain the printable model.

4. The system of claim 1, wherein the instructions are further executable by the processor to:
  obtain the 3-D model file from the content stream, wherein the content stream includes the 3-D model file.

5. The system of claim 1, wherein the printer includes at least one of a 3-D printer, ink printer, computer numerical control machine, or selective laser sintering machine.

6. The system of claim 1, wherein the 3-D model file includes at least one of a STL or 3MF file format.

7. The system of claim 1 further comprising a printables server, wherein the instructions are further executable by the processor to:
  obtain the 3-D model file, from the printables server responsive to the occurrence of the trigger.

8. The system of claim 1, wherein the instructions are further executable by the processor to:
  determine whether the media player is authorized to obtain the printable model based, at least in part, on the security token; and
  transmitting at least one of the 3-D model file or printing instructions based on the 3-D model file to the printer responsive to a determination that the media player is authorized to print the printable model.

9. The system of claim 1, wherein the instructions are further executable by the processor to:
  transmit, via a communications network, the 3-D model file to the printer.

10. The system of claim 1, wherein the instructions are further executable by the processor to:
  receive, via a communications network, the 3-D model file.

11. An apparatus comprising:
  a processor;
  a non-transitory computer readable medium comprising instructions executable by the processor to:
    obtain a content stream including at least one of an audio stream or a video stream, the content stream further including a data stream including a trigger associated with a printable model;
    obtain a 3-D model file associated with the printable model responsive to an occurrence of the trigger, wherein the trigger further comprises a design identifier and a security token, the design identifier uniquely identifying the 3-D model file, wherein the 3-D model file is obtained based on the design identifier, the security token authenticating the media player and authorizing the media player to print the 3-D model file;
    transmit, over a direct connection to a printer, printing instructions to print the 3-D model file to the printer;
    transmit, over the direct connection to the printer, the security token to the printer;
    cause, responsive to the printing instructions, the printer to obtain the 3-D model file over the direct connection; and
    transmit, via the direct connection, the 3-D model file to the printer;
    print, via the printer, the printable model based on the 3-D model file.

12. The apparatus of claim 11, wherein the instructions are further executable by the processor to:
store the 3-D model file in a storage device;
obtain, via the storage device, the 3-D model file responsive to a determination that an event associated with the trigger has occurred.

13. The apparatus of claim 11, wherein the instructions are further executable by the processor to:
receive, via a communications network, the 3-D model file; and
transmit, via the communications network, the 3-D model file to the printer.

14. The apparatus of claim 11, wherein the instructions are further executable by the processor to:
obtain the 3-D model file from the content stream, wherein the content stream includes the 3-D model file.

15. The apparatus of claim 11, wherein the instructions are further executable by the processor to:
determine an authorization to obtain the printable model based, at least in part, on the security token; and
transmitting at least one of the 3-D model file or printing instructions based on the 3-D model file to the printer responsive to a determination that the media player is authorized to print the printable model.

16. A method comprising:
obtaining, via a media player, a content stream including at least one of an audio stream or a video stream, the content stream further including a data stream including a trigger associated with a printable model;
obtaining, via the media player, a 3-D model file associated with the printable model responsive to an occurrence of the trigger, wherein the trigger further comprises a design identifier and a security token, the design identifier uniquely identifying the 3-D model file, wherein the 3-D model file is obtained based on the design identifier, the security token authenticating the media player and authorizing the media player to print the 3-D model file;
transmitting, via the media player, printing instructions to print the 3-D model file to a printer over a direct connection between the printer and the media player;
transmitting, via the media player, the security token to the printer;
obtaining, via the printer, the 3-D model file, over the direct connection, from the media player responsive to receiving the printing instructions; and
printing, via the printer, the printable model based on the 3-D model file.

17. The method of claim 16, further comprising:
storing, via the media player, the 3-D model file in a storage device;
obtaining, via the media player, the 3-D model file from the storage device responsive to a determination that an event associated with the trigger has occurred.

18. The method of claim 16, further comprising:
obtaining, via the media player, the 3-D model file from the content stream, wherein the content stream includes the 3-D model file.

19. The method of claim 16, further comprising:
receiving, via a communications network, the 3-D model file at the media player; and
transmitting, via the communications network, the 3-D model file from the media player to the printer.

20. The method of claim 16, further comprising:
determining, via the media player, whether the media player is authorized to obtain the printable model based, at least in part, on the security token; and
transmitting, via the media player, at least one of the 3-D model file or printing instructions based on the 3-D model file to the printer responsive to a determination that the media player is authorized to print the printable model.

* * * * *